US009590518B2

(12) United States Patent
Yan et al.

(10) Patent No.: US 9,590,518 B2
(45) Date of Patent: Mar. 7, 2017

(54) POWER CONVERTER AND CONTROLLING METHOD THEREOF

(71) Applicant: Delta Electronics, Inc., Taoyuan (TW)

(72) Inventors: Chao Yan, Taoyuan (TW); Liping Sun, Taoyuan (TW); Zhihui Ding, Taoyuan (TW); Desheng Guo, Taoyuang (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 14/952,878

(22) Filed: Nov. 25, 2015

(65) Prior Publication Data

US 2016/0276945 A1 Sep. 22, 2016

(30) Foreign Application Priority Data

Mar. 16, 2015 (CN) .......................... 2015 1 0114642

(51) Int. Cl.
*H02M 3/335* (2006.01)
*H02M 1/42* (2007.01)
*H02M 3/158* (2006.01)
*H02M 1/00* (2006.01)

(52) U.S. Cl.
CPC ......... *H02M 3/33592* (2013.01); *H02M 1/42* (2013.01); *H02M 1/4233* (2013.01); *H02M 3/1588* (2013.01); *H02M 2001/0058* (2013.01); *Y02B 70/126* (2013.01); *Y02B 70/1491* (2013.01); *Y02P 80/112* (2015.11)

(58) Field of Classification Search
CPC ................................................. H02M 3/33592
See application file for complete search history.

(56) References Cited

U.S. PATENT DOCUMENTS

| | | | | |
|---|---|---|---|---|
| 6,304,463 B1 * | 10/2001 | Krugly | .............. | H02M 3/33576 363/21.04 |
| 7,019,988 B2 * | 3/2006 | Fung | ................ | H02M 3/33538 363/131 |
| 2014/0003096 A1 * | 1/2014 | Deng | ................ | H02M 3/33592 363/21.14 |

* cited by examiner

*Primary Examiner* — Emily P Pham
(74) *Attorney, Agent, or Firm* — CKC & Partners Co., Ltd.

(57) ABSTRACT

The present application discloses a power converter and a controlling method thereof. The power converter at least comprises an inductor, a parasitic capacitor, an energy storage switch and a free-wheeling switch, and the controlling method is used for enabling the energy storage switch to maintain zero-voltage turn-on during the normal operation of the power converter. The controlling method comprising: within a switching period, the free-wheeling switch is turned on again for a preset time after the free-wheeling switch is turned on and turned off for the first time and after the inductor and the parasitic capacitor resonate, so that a voltage between two terminals of the energy storage switch can decline to zero, and when the voltage between two terminals of the energy storage switch declines to zero, the energy storage switch is turned on, thereby entering the next switching period of the power converter.

22 Claims, 12 Drawing Sheets

POWER CONVERTER AND CONTROLLING METHOD THEREOF

CROSS-REFERENCE TO RELATED APPLICATIONS

This non-provisional application claims priority under 35 U.S.C. §119(a) on Patent Application No. 201510114642.9 filed in P.R. China on Mar. 16, 2015, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD OF THE PRESENT APPLICATION

The present application relates to the technical field of switching power supply, and particularly to a method for achieving the control of a turn-on voltage of an energy storage switch in a power converter, and a corresponding power converter.

RELATED ART

Zero-voltage switching (ZVS) means that, when a switch is turned on, a voltage between two terminals thereof is zero, thereby reducing loss of the switch. In a power converter, achieving ZVS at a main power circuit may greatly improve the efficiency of the power converter.

The person skilled in the art knows that the main power circuit of the power converter has various topologies. FIG. 1 shows a topology of a Boost circuit.

Wherein Vin is an input voltage, $V_o$ is an output voltage. $S_2$ is an energy storage switch, and $S_1$ is a free-wheeling switch which comprises a synchronous rectifier switch and a free-wheeling diode D1 connected to each other in parallel.

When $S_2$ is turned on, an inductor L stores energy through $S_2$, and after $S_2$ is turned off, an inductance current $i_L$ freewheels through $S_1$, wherein $i_L$ is positive in the direction as shown in FIG. 1. $V_{s2}$ is a voltage between two terminals of the energy storage switch $S_2$, i.e., a drain-source voltage, and a diode $D_2$ is further connected in parallel at two terminals of $S_2$.

In order to achieve ZVS of the energy storage switch $S_2$, a controlling method of operating in Discontinuous Conduction Mode (DCM) is generally employed, as shown in FIGS. 2A and 2B.

FIG. 2A is an operating waveform diagram of the Boost circuit when $V_{in}<V_o/2$. In FIG. 2A, the first line from above represents a turn-on situation of $S_2$ and HIGH levels represent turn-on, the second line represents a turn-on situation of $D_1$ connected to $S_1$ in parallel and HIGH levels represent turn-on, the third line represents a current change situation of $i_L$, and the fourth line represents a voltage change situation of $V_{s2}$.

At a time point $t_1$, $S_2$ is turned on, $V_{s2}=0$, and the inductance current $i_L$ rises.

At a time point $t_2$, $S_2$ is turned off, $i_L$ declines, and $D_1$ is turned on to supply energy to the output terminal. At this moment, $V_{s2}=V_o$.

At a time point $t_3$, $i_L$ declines to zero, and $D_1$ is cut off. Without considering reverse recovery of the free-wheeling diode, the inductor L and a parasitic capacitor $C_{para}$ (e.g., a junction capacitor of the switch, a parasitic capacitor of the diode, a parasitic capacitor of the inductor in the main power circuit, etc.) resonate from the time point $t_3$, and the voltage $V_{s2}$ satisfies Formula (1).

$$V_{s2}(t)=V_{in}+(V_o-V_{in})\cdot\cos \omega_0(t-t_3) \qquad (1)$$

wherein $\omega_0=1/\sqrt{L\cdot C_{para}}$, L is an inductance value of the inductor, and $C_{para}$ is a capacitance value of the parasitic capacitor.

At a time point $t_4$, the voltage $V_{s2}$ is resonated to zero, and then $D_2$ is turned on. The inductance current $i_L$ freewheels through $D_2$, and the voltage $V_{s2}$ is clamped to zero. The inductance current gradually decreases reversely until the inductance current is zero at a time point $t_5$.

At any time points from $t_4$ to $t_5$, $V_{s2}$ is zero, and then $S_2$ can achieve ZVS turn-on. If $S_2$ is not turned on during this time period, the inductor L and the parasitic capacitor $C_{para}$ continues to resonate until the voltage $V_{s2}$ is resonated to zero at a time point $t_7$, and at this moment, $S_2$ is turned on to achieve ZVS turn-on.

The time interval between the two time points of turn-on of $S_2$ is a switching period, each switching period including the above processes.

Wherein, the synchronous rectifier switch also may be turned on for synchronous rectification during the turn-on period of the free-wheeling diode $D_f$.

As can be known from Formula (1), since the numerical range of cosine function is between −1 and 1, the value range of $V_{s2}$ is from $2V_{in}-V_o$ to $V_o$.

When $V_{in}<V_o/2$, the voltage $V_{s2}$ may be resonated to zero.

When $V_{in}>V_o/2$, the voltage $V_{s2}$ cannot be resonated to zero. As shown in FIG. 2B, it is an operating waveform diagram of the Boost circuit when $V_{in}>V_o/2$.

The time points from $t_1$ to $t_3$ are the same as that in FIG. 2A, the inductor L and the parasitic capacitor $C_{para}$ resonate from the time point $t_3$, and the $V_{s2}$ voltage satisfies Formula (1).

At the time point $t_4$ or $t_6$, the voltage $V_{s2}$ is resonated to a minimum value (but larger than 0), and then $S_2$ is turned on at the time point $t_4$ or $t_6$, which is called as a valley bottom turn-on. Although a portion of switching loss may be reduced, ZVS cannot be achieved.

As can be seen, the disadvantage of operating in DCM is that ZVS cannot be achieved when $V_{in}>V_o/2$. Although this controlling method may improve the efficiency of the power converter, it cannot ensure that it has a high efficiency under all input voltages or all loads.

SUMMARY OF THE APPLICATION

The present application provides a power converter and a controlling method thereof, which can achieve ZVS turn-on of an energy storage switch without adding any additional auxiliary elements in a main power circuit, while enabling the power converter to have a high efficiency during the normal operation.

In order to solve the above problem, one aspect of the present application discloses a controlling method of a power converter which at least comprises an inductor, a parasitic capacitor, an energy storage switch and a free-wheeling switch, and the controlling method is used for enabling the energy storage switch to maintain zero-voltage turn-on during the normal operation of the power converter; the method comprising: within a switching period, the free-wheeling switch is turned on again for a preset time after the free-wheeling switch is turned on and turned off for the first time and after the inductor and the parasitic capacitor resonate, so that a voltage between two terminals of the energy storage switch can decline to a threshold value, and when the voltage between two terminals of the energy storage switch declines to be less than or equal to the threshold value, the energy storage switch is turned on, thereby entering the next switching period of the power converter.

One other aspect of the present application further discloses a power converter. A power converter, comprising: a main power circuit, which at least comprises an inductor, a parasitic capacitor, an energy storage switch, and a free-wheeling switch; a sampling circuit for sampling input and output signals of the main power circuit; and a controller for generating a control signal to control turn-on and turn-off of the energy storage switch and the free-wheeling switch, wherein the controller further comprises a threshold control circuit for receiving the sample signal of the sampling circuit to control the free-wheeling switch to be turned on again for a preset time within one switching period of the power converter, so that a drain-source voltage of the energy storage switch is less than or equal to the threshold value when the next period of the power converter starts.

The technical solution provided by the present application may turn-on the energy storage switch while the drain-source voltage of the energy storage switch $S_2$ being less than or equal to a threshold voltage without adding any additional auxiliary elements in the main power circuit, so that the power converter has a high efficiency. In addition, when the power converter operates at a light load, employing the technical solution provided by the present application facilitates reducing the operating frequency, and improving the operating efficiency at the light load.

DESCRIPTION OF THE PREFERRED EMBODIMENT

Hereinafter a detailed description of specific implementation of the present application will be provided in connect with the appended drawings.

Figure 1:
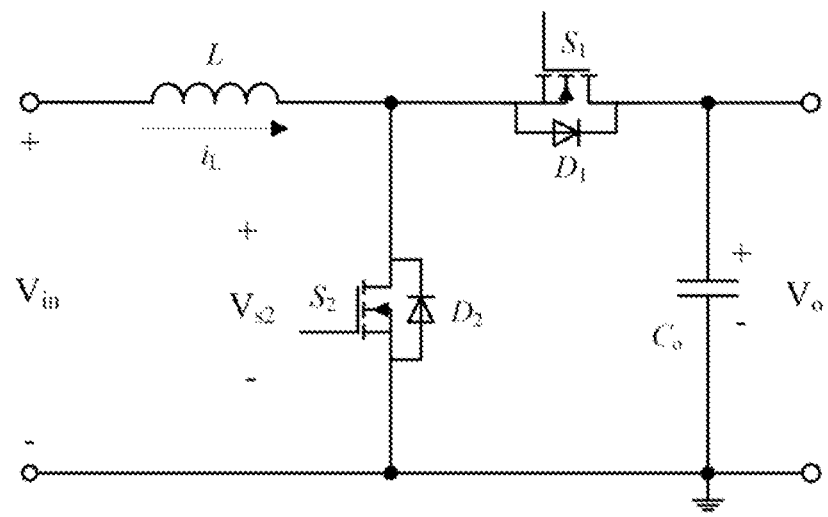
FIG. 1 is a topology of a Boost circuit.
Figure 2A:
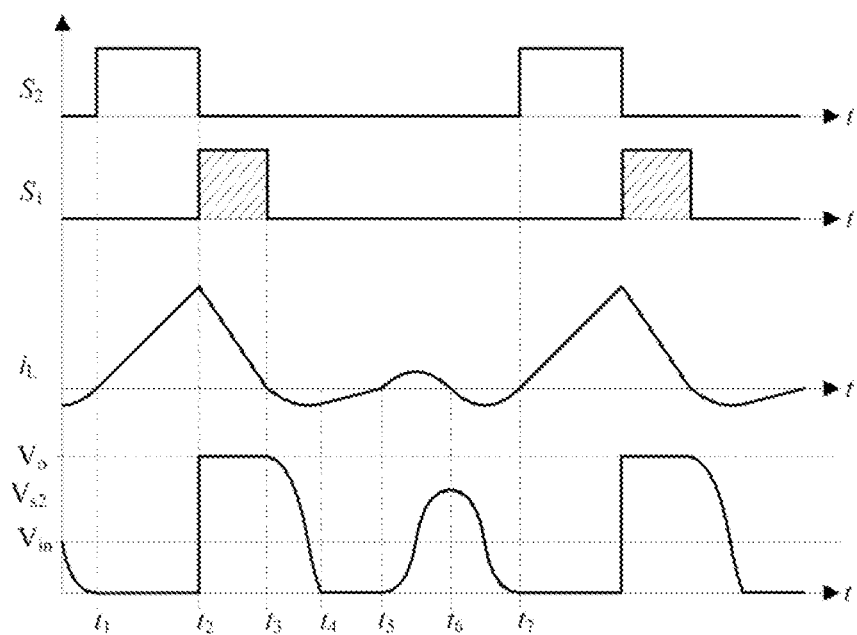
FIG. 2A is an operating waveform diagram of the Boost circuit when operating in DCM and $V_{in} < V_o/2$.
Figure 2B:
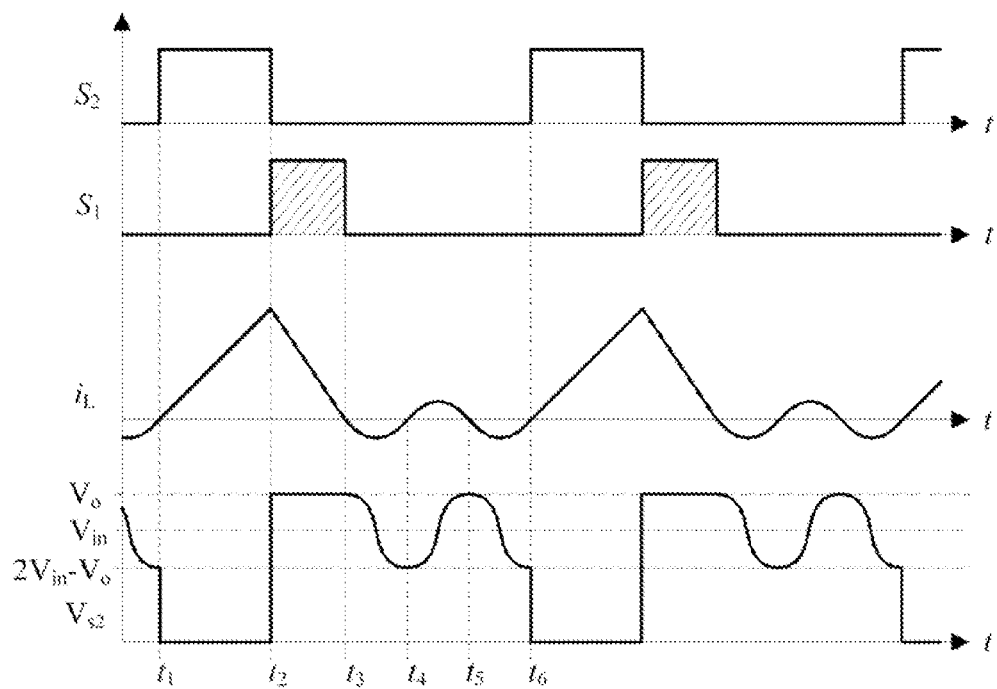
FIG. 2B is an operating waveform diagram of the Boost circuit when operating in DCM and $V_{in} > V_o/2$.
Figure 3:
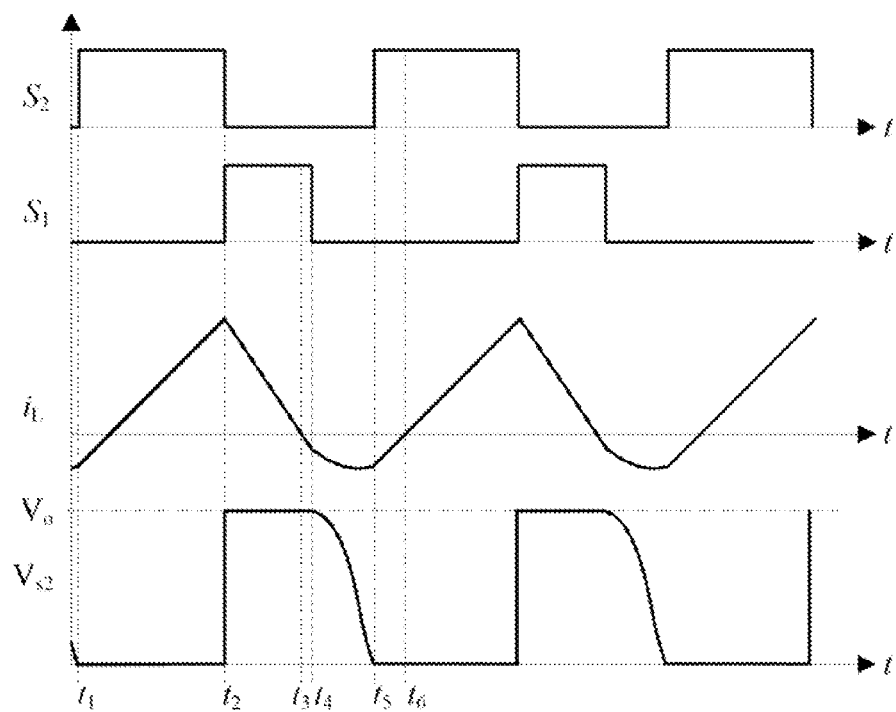
FIG. 3 is an operating waveform diagram of the Boost circuit employing a delay turn off method.

With respect to the controlling method in the Background Art, a method which delay turns off a free-wheeling switch S1 is disclosed with referring to the topology as shown in FIG. 1 and in connection with a control timing diagram as shown in FIG. 3. Such method of delay turning off the free-wheeling switch $S_1$ reverses an inductance current $i_L$, for storing enough energy in an inductor L, and ensures that a voltage between two terminals of an energy storage switch $S_2$ can be resonated to a relatively low threshold voltage or zero after the energy storage switch $S_2$ is turned off, thereby achieving the turn-on of the energy storage switch $S_2$ at a relatively low voltage. The threshold voltage as shown in FIG. 3 is zero, so herein it explains that the energy storage switch $S_2$ achieves zero-voltage turn-on.

At a time point $t_1$, $S_2$ is turned on, and the inductance current $i_L$ rises.

At a time point $t_2$, $S_2$ is turned off, $S_1$ is turned on, and the inductance current $i_L$ declines and flows through the free-wheeling switch $S_1$ to supply energy to the output terminal. At this moment, $V_{s2} = V_o$.

At a time point $t_3$, the inductance current $i_L$ declines to zero, $S_1$ continues to maintain turn-on, and then the inductance current $i_L$ increases reversely.

At a time point $t_4$, $S_1$ is turned off, and then the inductor L and a parasitic capacitor $C_{para}$ of a main power circuit resonate. The inductance current $i_L$ and the voltage $V_{s2}$ satisfies Formula (2), $$\begin{cases} i_L(t) = -\frac{(V_o - V_{in})\sin\omega_0(t-t_4)}{Z_0} + i_L(t_4)\cos\omega_0(t-t_4) \\ V_{s2}(t) = V_{in} + (V_o - V_{in}) \cdot \cos\omega_0(t-t_4) + i_L(t_4)Z_0\sin\omega_0(t-t_4) \end{cases} \quad (2)$$

Wherein, $Z_0 = \sqrt{L/C_{para}}$, $\omega_0 = 1/\sqrt{L \cdot C_{para}}$.

At a time point $t_5$, the voltage $V_{s2}$ is resonated to zero, and then a diode $D_2$ is turned on to clamp the voltage $V_{s2}$ to zero. A reverse inductance current gradually decreases until the inductance current $i_L$ is zero at a time point $t_6$.

At any time points from $t_5$ to $t_6$, $V_{s2}$ is zero, and then $S_2$ can achieve ZVS turn-on.

As compared with the controlling method in the Background Art, this controlling method may implement ZVS turn-on of $S_2$ at $V_{in} > V_o/2$. However, this controlling method still has disadvantages:

When the load is relatively light, if operating in a fixed switching frequency, a peak-peak value of the inductance current will be very large, which increases the conduction loss and the turn-off loss at the light load; if operating in a variable frequency (i.e., the frequency is relatively high at a light load, and is relatively low at a heavy load), then in order to achieve ZVS of the energy storage switch, the inductance current is $i_L(t_4)$ at the light load, that is, a reverse current occupies a large proportion in the inductance current, which affects the efficiency of the converter. Meanwhile, the relatively high switching frequency may also increase switching loss.

One aspect of the present application also provides a controlling method of a power converter, which can achieve ZVS turn-on of the energy storage switch without adding any additional auxiliary elements in the main power circuit, and improve the efficiency of the converter.

First Embodiment

Referring to the topology diagram of a Boost circuit as shown in FIG. 1, an example in which the power converter is a Boost circuit is explained herein. Herein, it also explains firstly that ZVS control can be implemented during the normal operation of the Boost circuit, and please refer to the control timing diagram in FIG. 4A.

At a time point $t_1$, the energy storage switch $S_2$ is turned on, and an inductance current $i_L$ rises.

At a time point $t_2$, the inductance current $i_L$ rises to a maximum value, $S_2$ is turned off, and the inductance current $i_L$ declines and flows through a free-wheeling diode $D_1$ to supply energy to the output terminal. At this moment, $V_{s2} = V_o$.

At a time point $t_3$, the inductance current $i_L$ declines to zero, and the free-wheeling diode $D_1$ is cut off. Without considering reverse recovery of the free-wheeling diode, an inductor L and a parasitic capacitor $C_{para}$ (e.g., a junction capacitor of the switch, a parasitic capacitor of the diode, a parasitic capacitor of the inductor, etc.) resonate from the time point $t_3$, and the voltage $V_{s2}$ satisfies Formula (1).

At a time point $t_4$, the voltage $V_{s2}$ is resonated to a minimum value.

At a time point $t_5$, the voltage $V_{s2}$ voltage has not resonated to a maximum value yet, and the free-wheeling switch $S_1$ is turned on at this moment. Due to $V_o > V_{in}$, the inductance current $i_L$ is reversely increased, and the voltage $V_{s2}$ is clamped at $V_o$.

At a time point $t_6$, $S_1$ is turned off, and then the inductor L and the parasitic capacitor $C_{para}$ resonate. The inductance current $i_L$ and the voltage $V_{s2}$ satisfy Formula (3), $$\begin{cases} i_L(t) = -\frac{(V_o - V_{in})\sin\omega_0(t - t_6)}{Z_0} + i_L(t_6)\cos\omega_0(t - t_6) \\ V_{s2}(t) = V_{in} + (V_o - V_{in}) \cdot \cos\omega_0(t - t_6) + i_L(t_6)Z_0\sin\omega_0(t - t_6) \end{cases} \quad (3)$$

-continued

Wherein, $Z_0 = \sqrt{L/C_{para}}$, $\omega_0 = 1/\sqrt{L \cdot C_{para}}$.

At a time point $t_7$, the voltage $V_{s2}$ is resonated to zero. At this moment, the inductance current $i_L$ is resonated to zero, and $S_2$ is turned on to achieve ZVS turn-on. Time point $t_1$ to the time point $t_7$ is a switching period.

Furthermore, a synchronous rectifier switch of the free-wheeling switch $S_1$ also may be turned on within the turn-on time of the free-wheeling diode $D_1$ from $t_2$ to $t_3$, so as to achieve synchronous rectification to further improve the efficiency of the converter.

In this embodiment, after the inductance current $i_L$ declines to zero for the first time (at the time point $t_3$), the free-wheeling switch $S_1$ is normally turned off instead of employing the delay turn off method, so that the inductor and the line parasitic capacitor resonate. During this period of resonance, the energy storage switch $S_2$ starts declining from the maximum clamping voltage, and the free-wheeling switch $S_1$ is turned on for a period of time to reversely store energy for the inductor L. The energy enables the voltage between two terminals of the energy storage switch $S_2$ to decline to a threshold voltage or zero by resonance, and when the voltage between two terminals of the energy storage switch $S_2$ declines to zero, ZVS turn-on of the energy storage switch $S_2$ may be achieved.

Figure 4A:
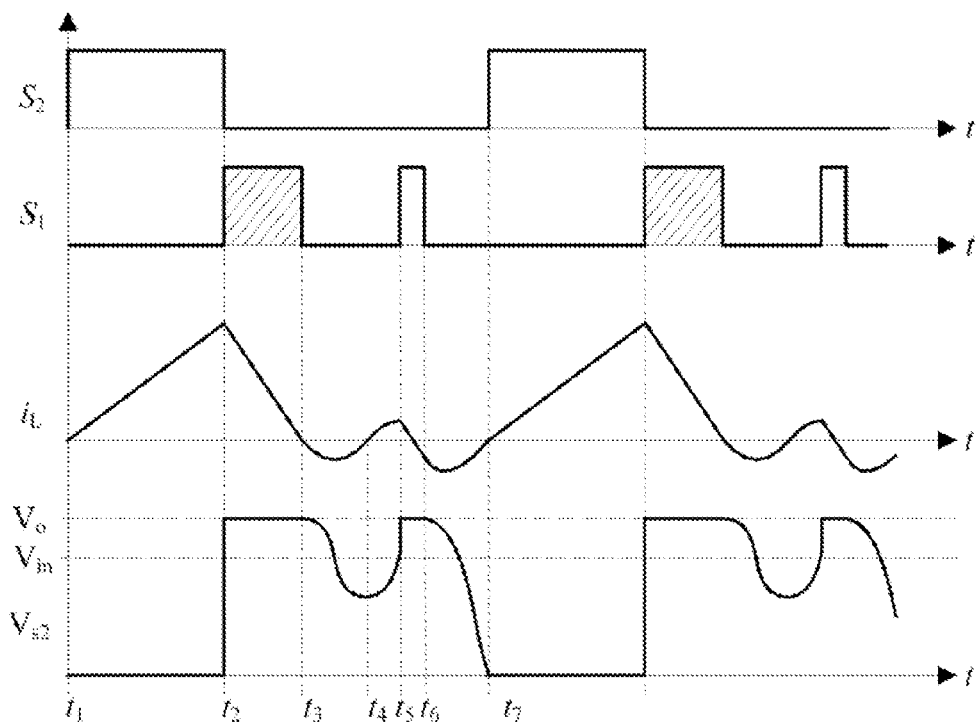
FIG. 4A is an operating waveform diagram of a first embodiment of the present application which is applied to the Boost circuit.

The turn-on time point of the free-wheeling switch $S_1$ may be selected at the time when a k-th resonance period is completed, wherein k>0, and k may be an integer or may be a decimal fraction. In the solution as shown in FIG. 4A, k is a decimal fraction less than 1. However, the turn-on time point also may be selected after a plurality of resonance periods, i.e., an integer or a decimal fraction larger than 1, thereby reducing the switching frequency. The turn-on duration will be specifically described in the following texts.

Specifically, at the time point $t_5$ in FIG. 4A when the free-wheeling switch $S_1$ is turned on, the voltage between two terminals of the energy storage switch $S_2$ has not resonated to a peak value yet, and a whole resonance period is not completed. The voltage between two terminals of the free-wheeling switch $S_1$ is not zero, thus the free-wheeling switch $S_1$ is hard turn-on, which increases a portion of loss, and $S_1$ does not achieve ZVS.

Second Embodiment

Figure 4B:
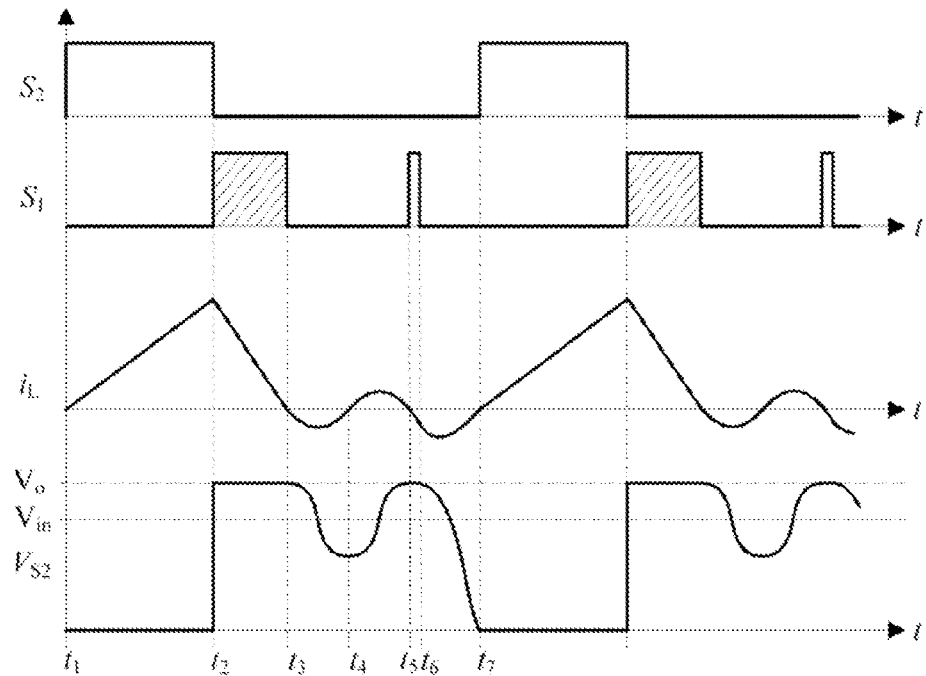
FIG. 4B is an operating waveform diagram of a second embodiment of the present application which is applied to the Boost circuit.

In this embodiment, the power converter is still illustrated as the Boost circuit. FIG. 4B is another control timing diagram of the Boost circuit. The second embodiment differs from the first embodiment in that both the energy storage switch S2 and the free-wheeling switch $S_1$ can achieve ZVS turn-on. At a time point $t_1$, the energy storage switch $S_2$ is turned on, and an inductance current $i_L$ rises.

At a time point $t_2$, the inductance current $i_L$ rises to a maximum value, $S_2$ is turned off, and the inductance current $i_L$ declines and flows through a free-wheeling diode $D_1$ to supply energy to the output terminal. At this moment, $V_{s2} = V_o$.

At a time point $t_3$, the inductance current $i_L$ declines to zero, and the free-wheeling diode $D_1$ is cut off. Without considering reverse recovery of the free-wheeling diode, an inductor L and a parasitic capacitor $C_{para}$ resonate, and the voltage $V_{s2}$ satisfies Formula (1).

At a time point $t_4$, the voltage $V_{s2}$ is resonated to a minimum value.

At a time point $t_5$, the voltage $V_{s2}$ is resonated to a maximum value, the inductance current $i_L$ is resonated to zero to complete a whole resonance period, and at this moment, the switch $S_1$ is turned on. Since the voltage between two terminals of $S_1$ is zero at this moment, $S_1$ is zero-voltage turned on, the inductance current $i_L$ reversely increases, and the voltage $V_{s2}$ is clamped at $V_o$.

At a time point $t_6$, $S_1$ is turned off, and then the inductor L and the parasitic capacitor $C_{para}$ resonate. The inductance current $i_L$ and the voltage $V_{s2}$ satisfy Formula (3).

At a time point $t_7$, the voltage $V_{s2}$ is resonated to zero. At this moment, the inductance current is resonated to zero, and $S_2$ is turned on to achieve ZVS turn-on of the energy storage switch.

At a time point $t_5$, the inductance current is resonated to zero, and the voltage between two terminals of $S_1$ is also zero, so the free-wheeling switch $S_1$ also achieves ZVS turn-on.

A synchronous rectifier switch of $S_1$ also may be turned on within the turn-on time of the free-wheeling diode D1 from $t_2$ to $t_3$, so as to achieve synchronous rectification to further improve the efficiency of the converter.

The time point when the free-wheeling switch is controlled to be turned on again is the time point $t_5$ when the inductance current $i_L$ is resonated to zero, that is, the time point when the voltage between two terminals of the free-wheeling switch is zero during the resonance of the inductor and the parasitic capacitor.

In this embodiment, k is an integer 1, and k also may be other integer larger than 0.

As can be seen, this embodiment may turn-on the energy storage switch $S_2$ while a drain-source voltage of the energy storage switch $S_2$ less than or equal to a threshold voltage without increasing additional lines and additional loss, and when the threshold voltage is zero, the control of ZVS turn-on of the energy storage switch can be achieved. The length of the turn-on duration of the free-wheeling switch $S_1$ decides the magnitude of a reverse current, and also decides whether the voltage between two terminals of the energy storage switch $S_2$ can be resonated to the threshold value. Thus, the length of the turn-on duration of the free-wheeling switch $S_1$ during the resonance affects the efficiency of the Boost circuit. In addition, the turn-on time point of the free-wheeling switch decides the switching frequency of the Boost circuit, and in the case that the inductor L meets the requirements, the larger k is, the smaller the switching frequency is.

Third Embodiment

Figure 5:
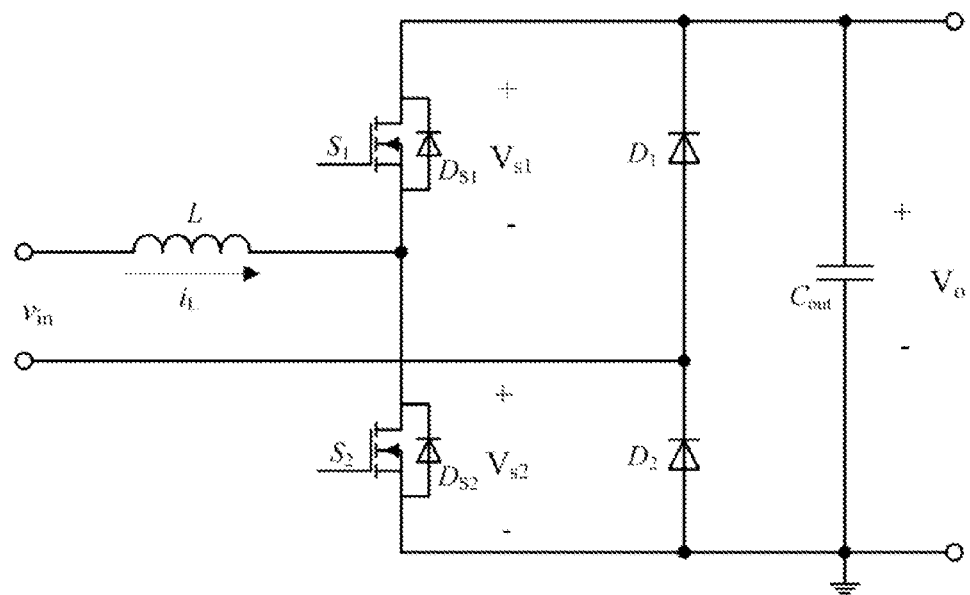
FIG. 5 is a topology diagram of a Totem-Pole PFC circuit.

In this embodiment, as an example in which the power converter is Totem-Pole PFC circuit, a method of controlling the energy storage switch and the free-wheeling switch is explained. FIG. 5 is a topology of the Totem-Pole PFC circuit, wherein $v_{in}$ is an AC input voltage ($v_{in}=\sqrt{2}V_{ac}\sin\theta$), and $V_o$ is an output voltage of the PFC.

Figure 6A:
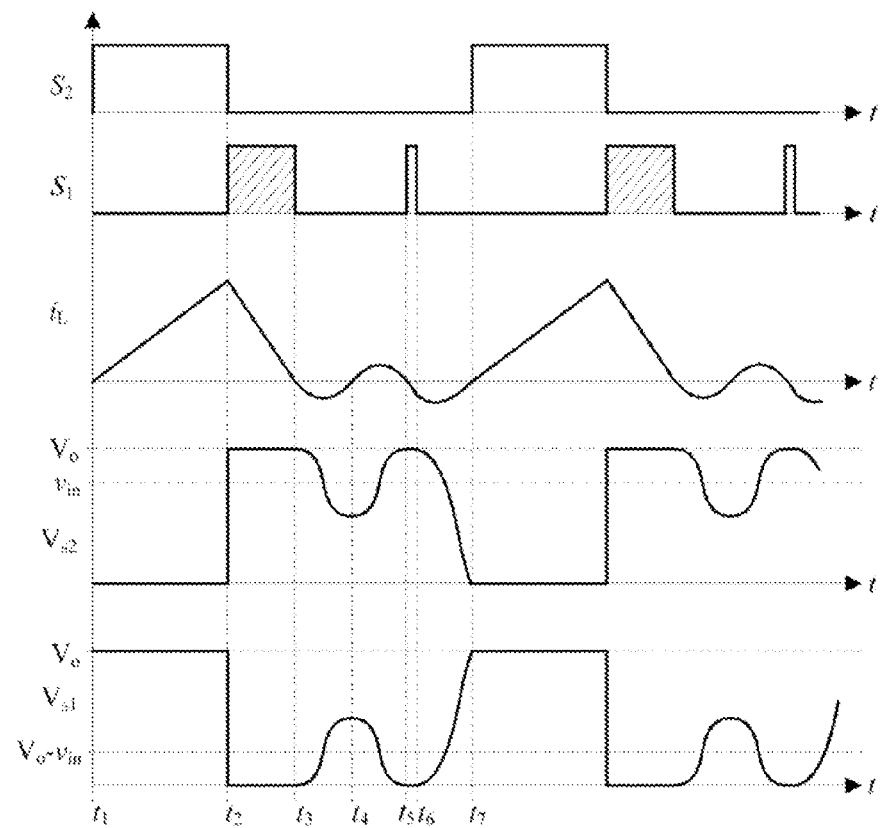
FIG. 6A is an operating waveform diagram of a third embodiment of the present application which is applied to the Totem-Pole PFC circuit at $v_{in} > 0$.

FIG. 6A shows a corresponding control timing diagram at the input voltage $v_{in}>0$ during the normal operation of the PFC circuit, and at the input voltage $v_{in}>0$, the operating principle of the PFC circuit is the same as that of the Boost circuit.

At a time point $t_1$, the energy storage switch $S_2$ is turned on, and a current flows through an inductor L, $S_2$, and a diode $D_2$. The input terminal stores energy for the inductor L, and an inductance current $i_r$ rises.

At a time point $t_2$, $S_2$ is turned off, the inductance current $i_L$ begins to decline, and the current flows through the inductor L, an anti-parallel diode $D_{s1}$ of the free-wheeling switch $S_1$, and the diode $D_2$ to charge an output capacitor $C_{out}$. At this moment, $V_{s2}=V_o$.

At a time point $t_3$, the inductance current $i_L$ declines to zero, and the anti-parallel diode $D_{s1}$ is cut off. Without considering reverse recovery of the diode, the inductor L and a parasitic capacitor $C_{para}$ resonate, and the voltages $V_{s1}$ and $V_{s2}$ satisfy Formula (4).

$$\begin{cases} V_{s1}(t) = (V_o - V_{in}) - (V_o - V_{in}) \cdot \cos\omega_0(t - t_3) \\ V_{s2}(t) = V_{in} + (V_o - V_{in}) \cdot \cos\omega_0(t - t_3) \end{cases} \quad (4)$$

$D_2$ is a slow diode, and it may be considered that $D_2$ is in an always on state in a positive half-cycle of the input voltage.

At a time point $t_5$, the voltage $V_{s2}$ is resonated to a maximum value, the voltage $V_{s1}$ is resonated to zero, and the inductance current $i_L$ is resonated to zero. At this moment, the free-wheeling switch $S_1$ is zero-voltage turned on, the inductance current $i_L$ reversely increases, and the voltage $V_{s2}$ is clamped at $V_o$.

At a time point $t_6$, $S_1$ is turned off, and then the inductor L and the parasitic capacitor $C_{para}$ resonate. The inductance current $i_L$ and the voltage $V_{s2}$ satisfy Formula (5), $$\begin{cases} i_L(t) = -\dfrac{(V_o - V_{in})\sin\omega_0(t - t_6)}{Z_0} + i_L(t_6)\cos\omega_0(t - t_6) \\ V_{s2}(t) = V_{in} + (V_o - V_{in}) \cdot \cos\omega_0(t - t_6) + i_L(t_6)Z_0\sin\omega_0(t - t_6) \end{cases} \quad (5)$$

At a time point $t_7$, the voltage $V_{s2}$ voltage is resonated to zero. At this moment, the inductance current $i_L$ is resonated to zero, and $S_2$ is turned on to achieve ZVS turn-on of the energy storage switch.

A synchronous rectifier switch of $S_1$ also may be turned on within the turn-on time of the anti-parallel diode $D_{s1}$ from $t_2$ to $t_3$, so as to achieve synchronous rectification to further improve the efficiency of the power converter.

Here illustrated is the embodiment in which the corresponding energy storage switch achieves zero-voltage turn-on during the operation at the input voltage of the PFC circuit $v_{in}>0$. Of course, the voltage of the energy storage switch does not need to achieve zero-voltage turn-on, and being less than a threshold voltage is also possible. In this embodiment, the voltage between two terminals of the energy storage switch when being turned on may be adjusted by adjusting the turn-on time (a time interval from $t_5$ to $t_6$) of the free-wheeling switch $S_1$.

Fourth Embodiment

Figure 6B:
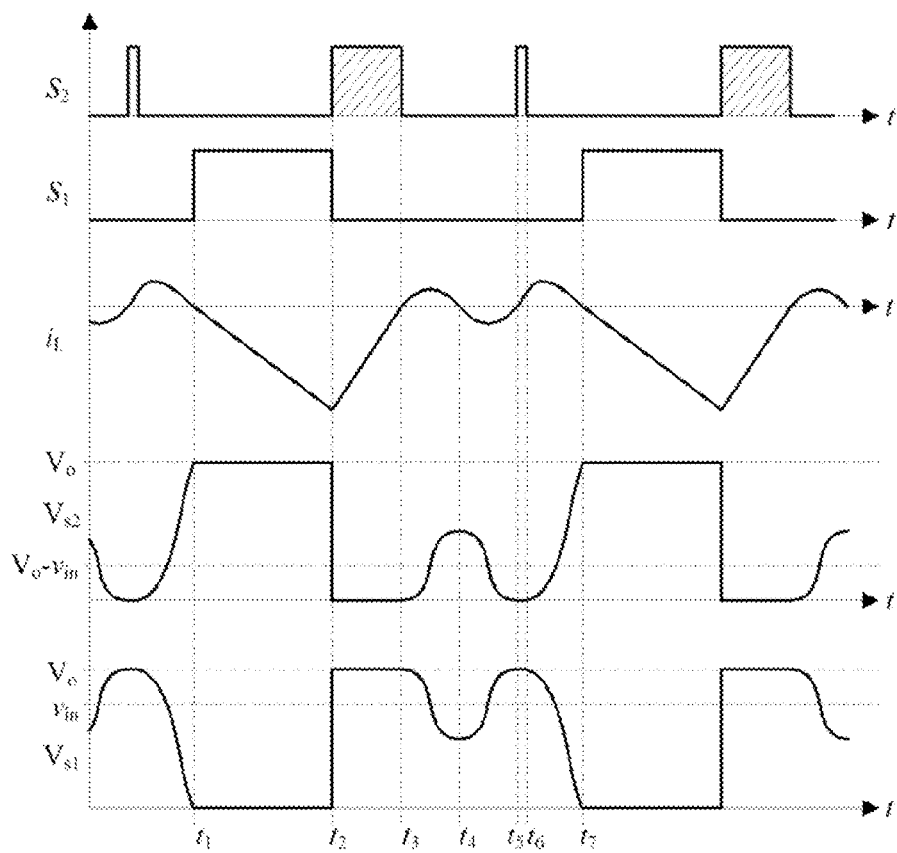
FIG. 6B is an operating waveform diagram of a fourth embodiment of the present application which is applied to the Totem-Pole PFC circuit at $v_{in} < 0$.

In the fourth embodiment, the power converter is still illustrated as the Totem Pole PFC circuit. FIG. 6B shows a corresponding control timing diagram at the input voltage $v_{in}<0$ during the normal operation of the PFC circuit. As compared with the control timing diagram at $v_{in}>0$ in FIG. 6A, in the control timing diagram at $v_{in}<0$ in FIG. 6B, an inductance current as shown in the control timing is reversed, and the energy storage switch is changed from $S_2$ to $S_1$.

At a time point $t_1$, the energy storage switch $S_1$ is in turn-on state, and a reverse current flow through the slow diode $D_1$, $S_1$ and the inductor L. The input stores energy for the inductor L, and the inductance current rises.

At a time point $t_2$, $S_1$ is turned off, the reverse inductance current begins to decrease, and the current flows through the diode $D_1$, the anti-parallel diode $D_{s2}$ of the free-wheeling switch $S_2$, and the inductor L to charge an output capacitor $C_{out}$. At this moment, $V_{s1}=V_o$.

At a time point $t_3$, the reverse inductance current declines to zero, and the anti-parallel diode $D_{s2}$ is cut off. Without considering reverse recovery of the diode, the inductor L and a parasitic capacitor $C_{para}$ resonate, and the voltage $V_{s1}$ satisfies Formula (6). Since $D_1$ is a slow diode, it may be considered that $D_1$ is in an always-on state in a negative half-cycle of the input voltage, $$\begin{cases} V_{s1}(t) = |v_{in}| + (V_o - |v_{in}|) \cdot \cos\omega_0(t-t_3) \\ V_{s2}(t) = (V_o - |v_{in}|) + (V_o - |v_{in}|) \cdot \cos\omega_0(t-t_3) \end{cases} \quad (6)$$

At a time point $t_5$, the voltage $V_{s1}$ is resonated to a maximum value, the voltage $V_{s2}$ is resonated to zero, the inductance current $i_L$ is resonated to zero, and the free-wheeling switch $S_2$ is zero-voltage turned on. Due to $V_o>v_{in}$, a forward inductance current increases and the voltage $V_{s1}$ is clamped at $V_o$.

At a time point $t_6$, $S_2$ is turned off, and then the inductor L and the parasitic capacitor $C_{para}$ resonate. The inductance current $i_L$ and the voltage $V_{s1}$ satisfy Formula (7), $$\begin{cases} i_L(t) = \dfrac{(V_o-|v_{in}|)\sin\omega_0(t-t_6)}{Z_0} + i_L(t_6)\cos\omega_0(t-t_6) \\ V_{s1}(t) = |v_{in}| + (V_o - |v_{in}|) \cdot \cos\omega_0(t-t_6) - i_L(t_6)Z_0\sin\omega_0(t-t_6) \end{cases} \quad (7)$$

At a time point $t_7$, the voltage $V_{s1}$ is resonated to zero, the inductance current $i_L$ is also resonated to zero, and $S_1$ is turned on to achieve ZVS turn-on of the energy storage switch.

A synchronous rectifier switch of the free-wheeling switch $S_2$ also may be turned on within the turn-on time of the anti-parallel diode $D_{s2}$ from $t_2$ to $t_3$, so as to achieve synchronous rectification to improve the efficiency of the power converter.

Fifth Embodiment

Figure 7A:
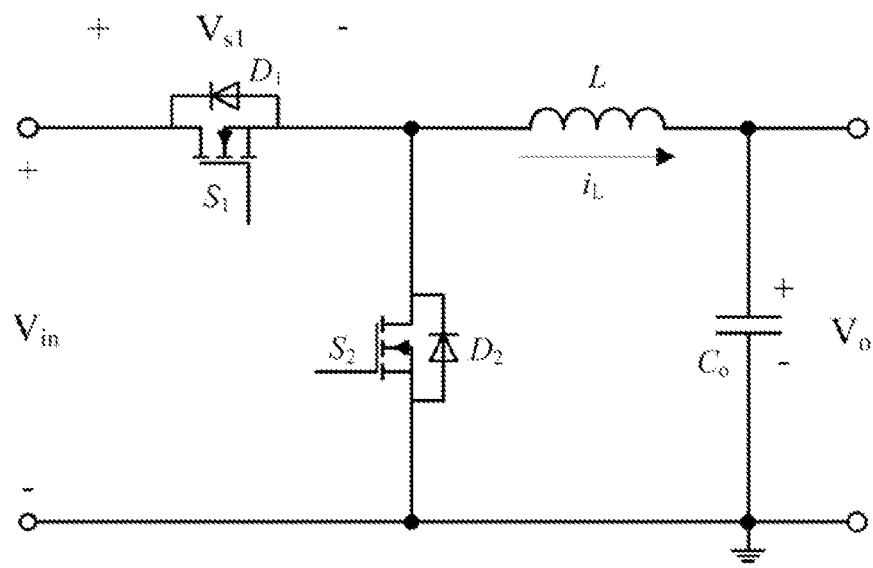
FIG. 7A is a topology of a Buck circuit.

In the fifth embodiment, an example in which the power converter is a Buck circuit is explained. FIG. 7A is a topology of the Buck circuit, wherein $S_1$ is an energy storage switch, and $S_2$ is a free-wheeling switch.

Figure 7B:
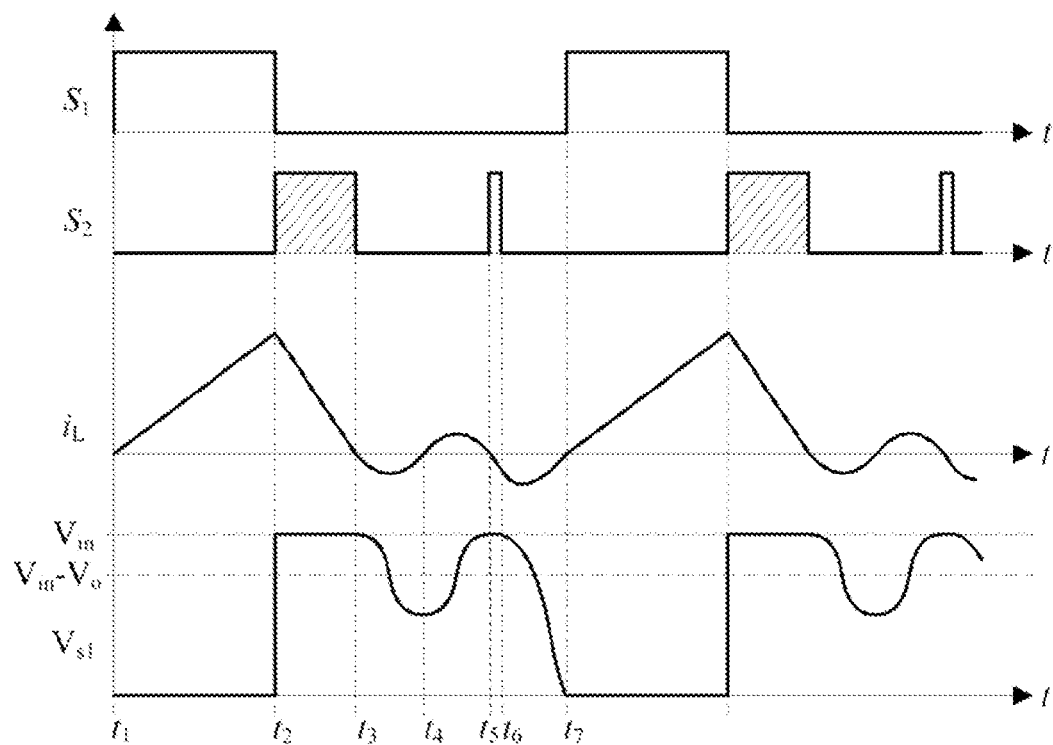
FIG. 7B is an operating waveform diagram of a fifth embodiment of the present application which is applied to the Buck circuit.

FIG. 7B is a control timing diagram for controlling operation of the Buck circuit.

At a time point $t_1$, $S_1$ is turned on, and an inductance current $i_L$ rises.

At a time point $t_2$, $S_1$ is turned off, and the inductance current $i_L$ declines and flows through a free-wheeling diode $D_2$ of $S_2$ to supplies energy to the output terminal. At this moment, $V_{s1}=V_{in}$.

At a time point $t_3$, the inductance current $i_L$ declines to zero, and the free-wheeling diode $D_2$ is cut off. Without considering reverse recovery of the diode, an inductor L and a parasitic capacitor $C_{para}$ resonate, and a voltage $V_{s1}$ between two terminals of $S_1$ satisfies Formula (8), $$V_{s1}(t)=(V_{in}-V_o)+V_o\cdot\cos\omega_0(t-t_3) \quad (8)$$

Wherein, $\omega_0=1/\sqrt{L \cdot C_{para}}$.

At a time point $t_5$, the voltage $V_{s1}$ is resonated to a maximum value, the inductance current $i_L$ is resonated to zero, and $S_2$ is turned on. At this moment, the voltage between two terminals of $S_2$ is zero, $S_2$ is zero-voltage turn-on, the inductance current reversely increases, and the voltage $V_{s1}$ is clamped at $V_{in}$.

At a time point $t_6$, $S_2$ is turned off, and then the inductor L and the parasitic capacitor $C_{para}$ resonate. The inductance current $i_L$ and the voltage $V_{s1}$ satisfy Formula (9), $$\begin{cases} i_L(t) = -\dfrac{V_o\sin\omega_0(t-t_6)}{Z_0} + i_L(t_6)\cos\omega_0(t-t_6) \\ V_{s1}(t) = (V_{in}-V_o) + V_o\cos\omega_0(t-t_6) + i_L(t_6)Z_0\sin\omega_0(t-t_6) \end{cases} \quad (9)$$

Wherein, $Z_0 = \sqrt{L/C_{para}}$, $\omega_0 = 1/\sqrt{L \cdot C_{para}}$.

At a time point $t_7$, the voltage $V_{s1}$ is resonated to zero. At this moment, the inductance current is resonated to zero, and $S_1$ is turned on to achieve ZVS turn-on of the energy storage switch $S_1$.

A synchronous rectifier switch of $S_2$ also may be turned on within the turn-on time of the free-wheeling diode from $t_2$ to $t_3$, so as to achieve synchronous rectification to improve the efficiency of the power converter.

Sixth Embodiment

Figure 8A:
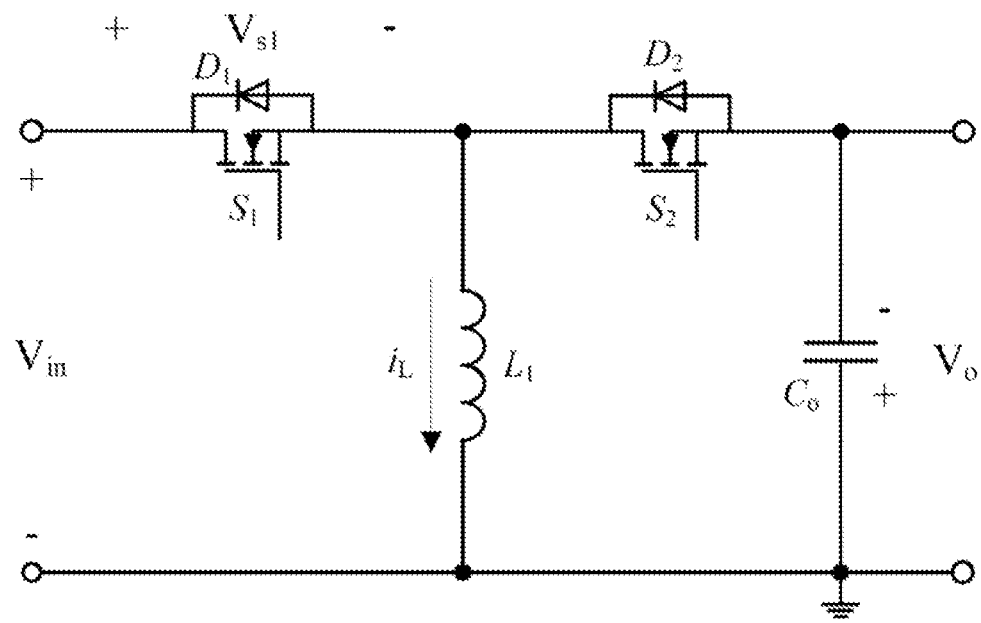
FIG. 8A is a topology of a Buck-Boost circuit.
Figure 8B:
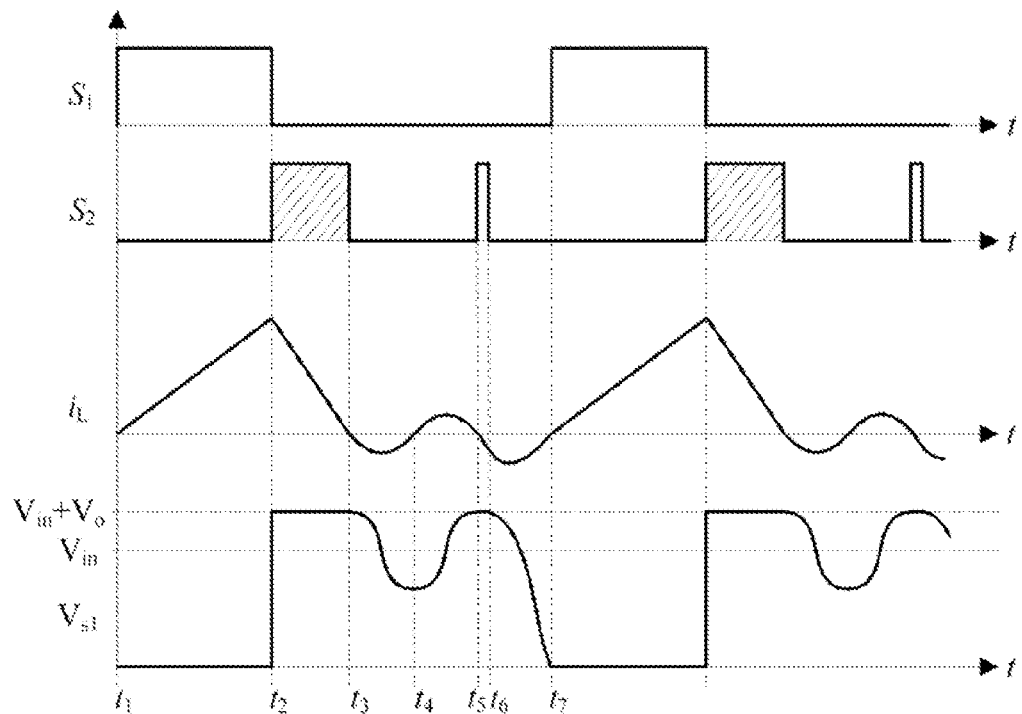
FIG. 8B is an operating waveform diagram of a sixth embodiment of the present application which is applied to the Buck-Boost circuit.

The sixth embodiment explains an example in which the power converter is a Buck-Boost circuit. FIG. 8A is a topology of the Buck-Boost circuit, wherein $S_1$ is an energy storage switch, and $S_2$ is a free-wheeling switch. FIG. 8B is a control timing diagram corresponding to the Buck-Boost circuit. At a time point $t_1$, $S_1$ is turned on, and an inductance current $i_L$ rises.

At a time point $t_2$, $S_1$ is turned off, and the inductance current $i_L$ declines and flows through a free-wheeling diode $D_2$ to supply energy to the output terminal. At this moment, $V_{s1}=V_{in}+V_o$.

At a time point $t_3$, the inductance current $i_L$ declines to zero, and the free-wheeling diode $D_2$ is cut off. Without considering reverse recovery of the free-wheeling diode, an inductor L and a parasitic capacitor $C_{para}$ resonate, and the voltage $V_{s1}$ satisfies Formula (10).

$$V_{s1}(t)=V_{in}+V_o\cos\omega_0(t-t_3)$$

Wherein, $\omega_0=1/\sqrt{L \cdot C_{para}}$. \quad (10)

At a time point $t_5$, the voltage $V_{s1}$ is resonated to a maximum value, the inductance current $i_L$ is resonated to zero, and $S_2$ is turned on. At this moment, the voltage between two terminals of $S_2$ is zero, $S_2$ is zero-voltage turn-on, the inductance current reversely increases, and the voltage $V_{s1}$ is clamped at $V_{in}+V_o$.

At a time point $t_6$, $S_2$ is turned off, and then the inductor L and the parasitic capacitor $C_{para}$ resonate. The inductance current $i_L$ and the voltage $V_{s1}$ satisfy Formula (11), $$\begin{cases} i_L(t) = -\dfrac{V_o\sin\omega_0(t-t_6)}{Z_0} + i_L(t_6)\cos\omega_0(t-t_6) \\ V_{s1}(t) = V_{in} + V_o\cos\omega_0(t-t_6) + i_L(t_6)Z_0\sin\omega_0(t-t_6) \end{cases} \quad (11)$$

-continued

Wherein, $$Z_0 = \sqrt{L/C_{para}},$$

$$\omega_0 = 1/\sqrt{L \cdot C_{para}}.$$

At a time point $t_7$, the voltage $V_{s1}$ is resonated to zero. At this moment, the inductance current is resonated to zero, and $S_1$ is turned on to achieve ZVS turn-on of the energy storage switch $S_1$.

A synchronous rectifier switch of $S_2$ also may be turned on within the turn-on time of the free-wheeling diode $D_2$ from $t_2$ to $t_3$, so as to achieve synchronous rectification to improve the efficiency of the power converter.

In this embodiment, an example in which the energy storage switch may achieve zero-voltage turn-on is still illustrated. However, this embodiment may similarly control the voltage of the energy storage switch to be less than or equal to a threshold value when being turned on in the next period, by controlling the time of turning on the free-wheeling switch $S_2$ again.

Seventh Embodiment

Figure 9A:
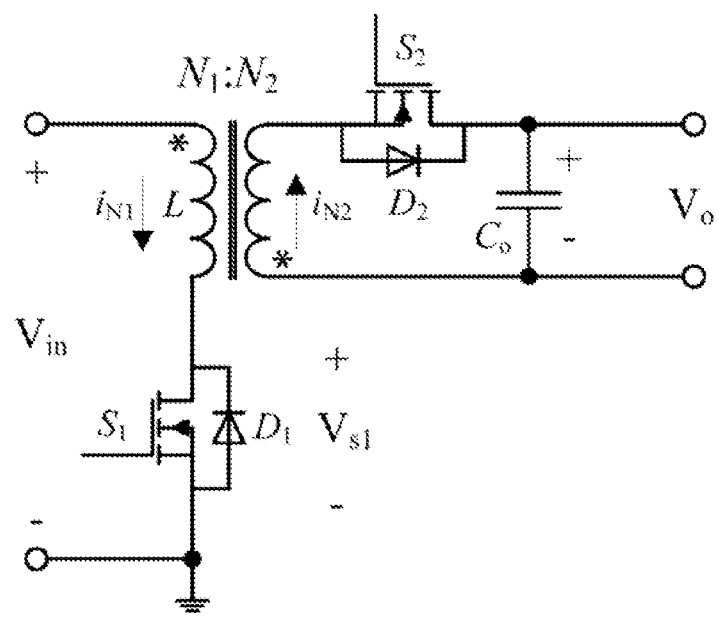
FIG. 9A is a topology of a Flyback circuit.
Figure 9B:
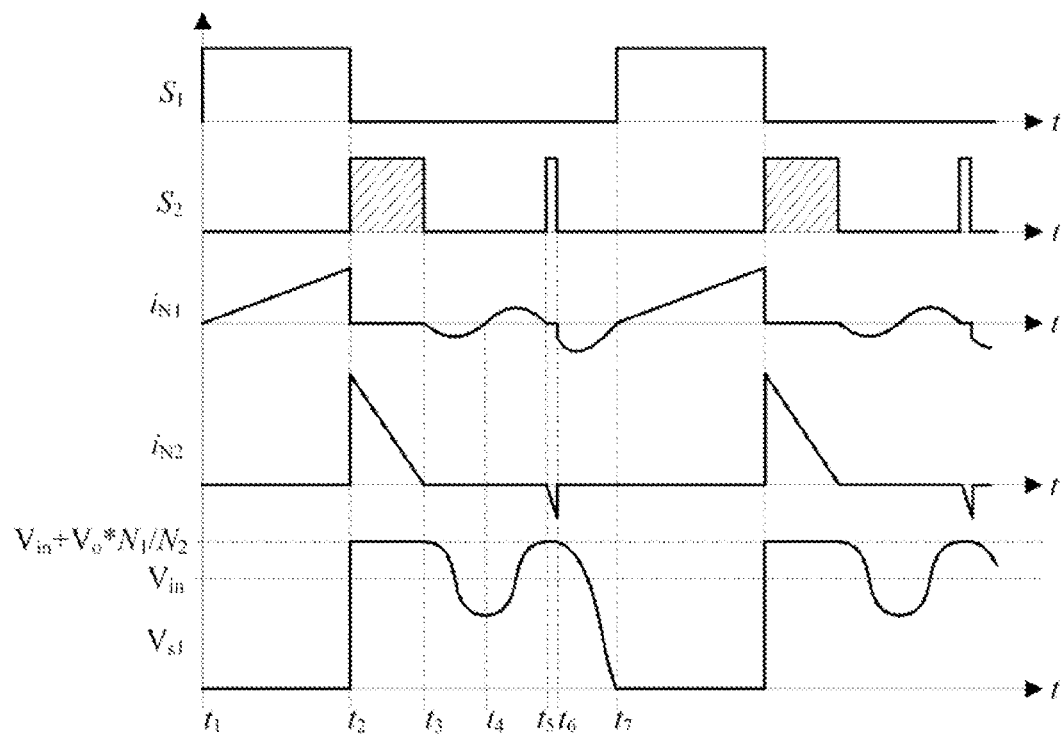
FIG. 9B is an operating waveform diagram of a seventh embodiment of the present application which is applied to the Flyback circuit.

In the seventh embodiment, an example in which the power converter is a Flyback circuit is explained. FIG. 9A is a topology of the Flyback circuit, wherein $S_1$ is an energy storage switch, $S_2$ is a free-wheeling switch, a transformer turns ratio is $N_1:N_2$, and L is a primary side magnetizing inductor. FIG. 9B is a control timing diagram corresponding to the Flyback circuit.

At a time point $t_1$, $S_1$ is turned on, and a transformer primary side current $i_{N1}$ rises.

At a time point $t_2$, $S_1$ is turned off, the primary side current is transferred to a secondary side, and a secondary side current $i_{N2}$ flows through a free-wheeling diode $D_2$ to supply energy to the output terminal. At this moment, $V_{s1}=V_{in}+V_o*N_1/N_2$.

At a time point $t_3$, the secondary side current declines to zero, and the free-wheeling diode $D_2$ is cut off Without considering reverse recovery of the free-wheeling diode, the primary side magnetizing inductance L and a parasitic capacitor $C_{para}$ resonate, and the voltage $V_{s1}$ satisfies Formula (12), $$V_{s1}(t) = V_{in} + \frac{N_1}{N_2}V_o\cos\omega_0(t-t_3) \tag{12}$$

Wherein, $$\omega_0 = 1/\sqrt{L \cdot C_{para}}.$$

At a time point $t_5$, the voltage $V_{s1}$ is resonated to a maximum value, and after converting a transformer primary side voltage to a secondary side, it can be known that the voltage between two terminals of $S_2$ is zero at this moment, $S_2$ is turned on, and $S_2$ is zero-voltage turn-on. The secondary side current $i_{N2}$ reversely increases, and the voltage $V_{s1}$ is clamped at $V_{in}+V_o*N_1/N_2$.

At a time point $t_6$, $S_2$ is turned off, secondary side energy is transferred to the primary side, and the primary side magnetizing inductor L and the line parasitic capacitor $C_{para}$ resonate. The primary side current $i_{N1}$ and the voltage $V_{s1}$ satisfy Formula (13), $$\begin{cases} i_L(t) = -\dfrac{\dfrac{N_1}{N_2}V_o\sin\omega_0(t-t_6)}{Z_0} + i_L(t_6)\cos\omega_0(t-t_6) \\ V_{s1}(t) = V_{in} + \dfrac{N_1}{N_2}V_o\cos\omega_0(t-t_6) + i_L(t_6)Z_0\sin\omega_0(t-t_6) \end{cases} \tag{13}$$

Wherein, $$Z_0 = \sqrt{L/C_{para}},$$

$$\omega_0 = 1/\sqrt{L \cdot C_{para}}.$$

At a time point $t_7$, the voltage $V_{s1}$ is resonated to zero. At this moment, the primary side current is resonated to zero, and $S_1$ is turned on to achieve ZVS turn-on of the energy storage switch $S_1$.

A synchronous rectifier switch of $S_2$ also may be turned on within the turn-on time of the free-wheeling diode $D_2$ from $t_2$ to $t_3$, so as to achieve synchronous rectification to improve the efficiency of the power converter.

Based on the above seven embodiments, the turn-on duration of the energy storage switch $S_2$ is defined as $T_{on}$ ($t_1$~$t_2$), the duration that the inductance current declines to zero for the first time after $S_2$ is turned off is defined as $T_{off}$ ($t_2$~$t_3$), a resonance period of the inductor and the parasitic capacitor is $T_{r1}$ ($t_3$~$t_5$), the turn-on duration of the free-wheeling switch $S_1$ is $T_{syn\_rec}$ ($t_5$~$t_6$), and a required time that a voltage $V_{s2}$ between two terminals of the energy storage switch $S_2$ is resonated from a peak voltage to a threshold value is $T_{r2}$ ($t_6$~$t_7$). When the free-wheeling switch needs to be turned on at least twice within a switching period of the power converter, a switching period $T_s$ is:

$$T_s = T_{on} + T_{off} + k \cdot T_{r1} + T_{syn\_rec} + T_{r2} \tag{14}$$

Wherein, k>0. According to the above embodiments, it can be known that k may be selected as an integer or a decimal fraction. When k is a decimal fraction, the voltage between two terminals of the free-wheeling switch is not zero when being turned on, and the voltage between two terminals of the energy storage switch may enable to be less than or equal to the threshold value; and when k is an integer, the free-wheeling switch is zero-voltage and zero-current turned-on, and the energy storage switch may decline to the threshold voltage or achieve ZVS. A preferable solution of the present application is that k is an integer.

In a closed-loop system corresponding to the power converter, the turn-on duration $T_{on}$ of the energy storage switch is generally decided by a closed-loop output, so $T_{on}$ is a known quantity, and then $T_{off}$ and $T_{on}$ satisfy Formula (15).

$$T_{off} = T_{on}\frac{V_{in}}{V_o - V_{in}} \tag{15}$$

The resonance period $T_{r1}$ satisfies Formula (16).

$$T_{r1} = \frac{2\pi}{\omega_0} \tag{16}$$

The length of turn-on duration of the free-wheeling switch decides the stored energy of the inductor, thereby deciding whether the voltage between two terminals of the energy storage switch can be resonated to the threshold value or zero. If it is required that the voltage between two terminals of the energy storage switch can decline to the threshold value when the energy storage switch is turned on in the next period, the turn-on time $T_{syn\_rec}$ of the free-wheeling switch needs to satisfy Formula (17).

$$T_{syn\_rec} \geq \frac{\sqrt{(2V_{in} - V_o) \cdot (V_o - V_{th})}}{\omega_0 (V_o - V_{in})} \quad (17)$$

The required time $T_{r2}$ that the voltage $V_{s2}$ between two terminals of the energy storage switch is resonated from $V_o$ to the threshold voltage $V_{th}$ satisfies Formula (18).

$$T_{r2} = \frac{2 \arctan\left(\frac{-i_L(t_6) \cdot Z_0 - \sqrt{(i_L(t_6) \cdot Z_0)^2 - (2V_{in} - V_o)(V_o - V_{th})}}{(2V_{in} - V_o)}\right)}{\omega_0} \quad (18)$$

Wherein $t_6$ is an end time point of the turn-on duration of the free-wheeling switch, and $i_L(t_6)$ satisfies Formula (19), $$i_L(t_6) = \frac{V_{in} - V_o}{L} \cdot T_{syn\_rec} \quad (19)$$

wherein $$Z_0 = \sqrt{L/C_{para}}.$$

As can be known from Formulas (8)-(13), the lengths of $T_{off}$, $T_{syn\_rec}$, $T_{r2}$ and $T_s$ are mainly related to $V_{in}$, $V_o$, L and $C_{para}$, wherein $V_{in}$ and $V_o$ can be obtained by sampling, and L and $C_{para}$ are known parameters of the power converter. Thus, $T_{off}$, $T_{syn\_rec}$, $T_{r2}$ and $T_s$ in the next one or several periods can be predicted by employing the obtained $V_{in}$ and $V_o$. The sampling information may be the current sampling information, and also may be the information in the previous several periods after being filtered.

In addition, when the power converter operates at a light load, the operating frequency of the power converter may be reduced by improving the k value to increase $T_s$, and further improve the operating efficiency of the power converter at the light load. When the power converter operates at a heavy load, the k value can be reduced as much as possible to decrease $T_s$ by utilizing the controlling methods of the present application, so as to ensure the operating efficiency at the heavy load. Thus, such controlling method of the power converter facilitates maintaining a relatively good operating efficiency and reducing loss during the normal operation of the power converter.

Figure 10:
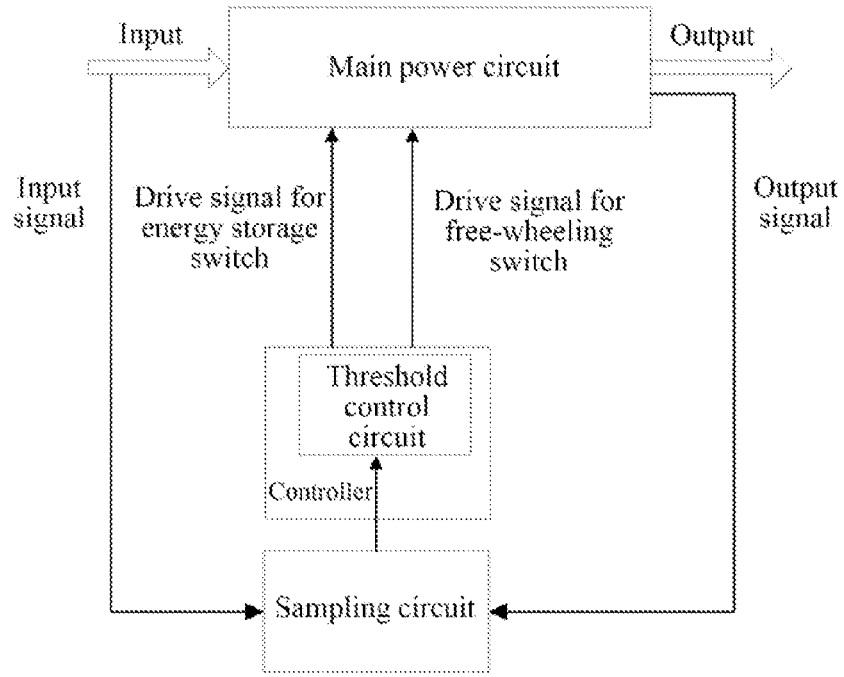
FIG. 10 shows a structural diagram of the power converter of the present application.

In order to achieve the above controlling method, the other aspect of the present application provides a power converter. FIG. 10 shows a structural diagram of the power converter. The power converter comprises a main power circuit, a controller and a sampling circuit. The main power circuit at least comprises an inductor, a parasitic capacitor, an energy storage switch and a free-wheeling switch. The main power circuit may refer to that shown in above FIGS. 1, 5, 7A, 8A and 9A. The sampling circuit samples input and output signals of the main power circuit. The controller generates a control signal to control the turn-on and turn-off of the energy storage switch and the free-wheeling switch. The controller further comprises a threshold control circuit which receives a sample signal of the sampling circuit, and controls the free-wheeling switch to be turned on again for a preset time within one switching period of the power converter, so that a voltage between two terminals of the energy storage switch declines to a threshold value or zero when the next period of the power convert starts.

The control portion of the above power converter may be specifically implemented by different methods.

Method One is to implement in a digital manner. The controller is a MCU or DSP digital control chip, and both the threshold control circuit and the sampling circuit are digital program modules assembled in the digital control chip.

Figure 11:
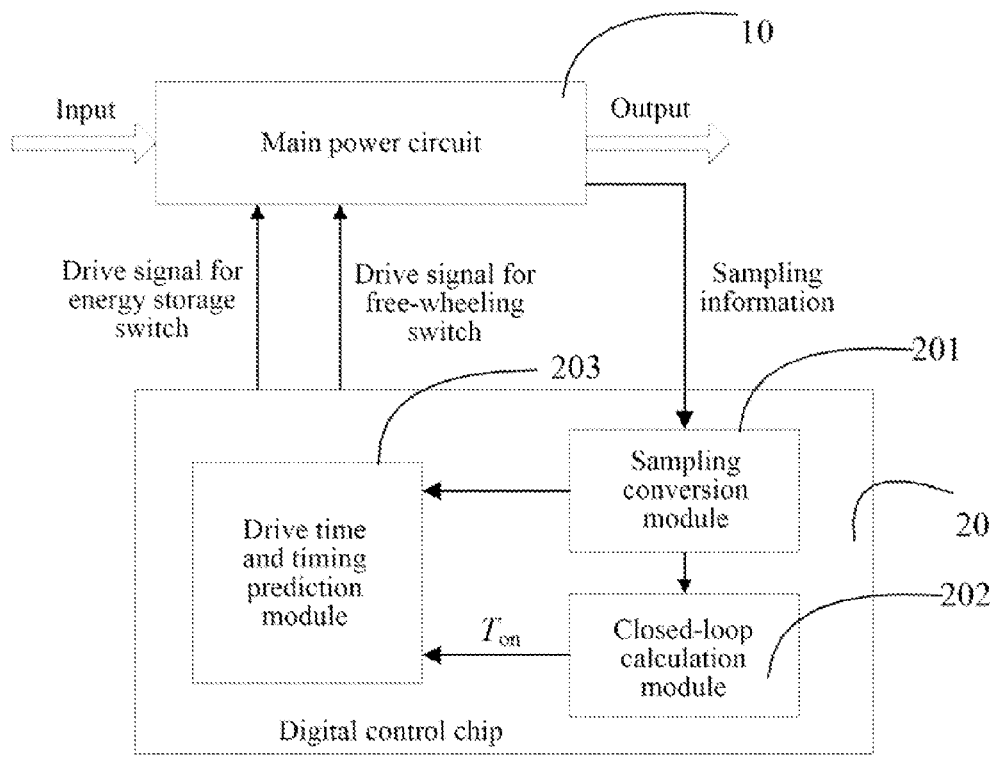
FIG. 11 shows a structural diagram of the power converter of the present application which achieves ZVS control in Method One.

FIG. 11 shows a structural diagram of the power converter corresponding to Method One.

As shown in FIG. 11, the digital program module assembled in the digital control chip 20 comprises a sampling conversion module 201, a closed-loop calculation module 202, and a drive time and timing prediction module 203.

The sampling conversion module 201 corresponds to the sampling circuit in FIG. 10. The sampling conversion module 201 samples the main power circuit 10 in real time to obtain the sampling information, and performs analog-digital conversion to obtain a digital sample signal. The digital sample signal comprises a sampling value $V_o$ of an output voltage, a sampling value $V_{in}$ of an input voltage, and a sampling value $i_L$ of an inductance current. The sampling conversion module 201 transmits the digital sample signal in real time to the closed-loop calculation module 202 and the drive time and timing prediction module 203.

The closed-loop calculation module 202 comprises a voltage loop calculation, a current loop calculation or a feedforward calculation, etc. for performing closed-loop calculation in accordance with the digital sample signal to obtain the turn-on duration $T_{on}$ of the energy storage switch. The closed-loop calculation module 202 transmits the turn-on duration $T_{on}$ to the drive time and timing prediction module 203.

The drive time and timing prediction module 203 is connected with the main power circuit 10. The drive time and timing prediction module 203 is used for $T_{on}$ and the digital sample signal, and predicts the turn-on time point and the turn-on duration of the switch in the next switching period or the next several switching periods in accordance with the above Formulas (1)-(19). The drive time and timing prediction module 203 is further used to send a corresponding drive signal for the energy storage switch or drive signal for the free-wheeling switch to the main power circuit 10 at the corresponding time point, so as to achieve the purpose that "in one switching period of the power converter, the free-wheeling switch is normally turned off after the inductance current declines to zero for the first time, the free-wheeling switch is driven to be turned on again when the inductor and the parasitic capacitor in the main power circuit complete a k-th resonance period and to be turned off after the turn-on duration $L_{syn\_rec}$ which satisfies Formula (17), and the energy storage switch is turned on when a voltage between two terminals of the energy storage switch is resonated to a threshold value $V_{th}$, so as to enter the next period".

Specifically, it takes the second embodiment as an example.

At the time point $t_1$, the drive time and timing prediction module 203 sends a turn-on drive signal to the energy storage switch $S_2$ to turn on the energy storage switch $S_2$.

After the turn-on duration $T_{on}$, it reaches the time point $t_2$, and at this moment, the inductance current $i_L$ rises to the maximum value, the drive time and timing prediction module 203 sends a turn-off drive signal to the energy storage switch $S_2$ to turn off $S_2$, and the inductance current $i_L$ declines and flows through the diode $D_1$ to supply energy to the output terminal. At this moment, $V_{s2}=V_o$.

After the time duration $T_{off}$ obtained by calculation, it reaches the time point $t_3$, and at this moment, the inductance current $i_L$ declines to zero, the diode $D_1$ is automatically cut off, and the drive time and timing prediction module 203 does not need to send the drive signal. Without considering reverse recovery of the diode, the inductor L and the line parasitic capacitor $C_{para}$ resonate.

After k resonance periods $T_{r1}$ obtained by calculation, it reaches the time point $t_5$, and at this moment, the drive time and timing prediction module 203 sends the turn-on drive signal to the free-wheeling switch $S_1$ to turn on the switch $S_1$.

After the turn-on duration $T_{syn\_rec}$ of $S_1$ obtained by calculation, it reaches the time point $t_6$, and at this moment, the drive time and timing prediction module 203 sends the turn-off drive signal to the free-wheeling switch $S_1$ to turn off $S_1$.

After the time $T_{r2}$ obtained by calculation, it reaches the time point $t_7$, the voltage $V_{s2}$ is resonated to the threshold value, and at this moment, the inductance current is resonated to zero, and the drive time and timing prediction module 203 sends the turn-on drive signal to the energy storage switch S2 to turn on S2, thereby achieving turn-on of the energy storage switch by the drain-source voltage of that being less than or equal to the threshold value or ZVS turn-on.

The drive time and timing prediction module 203 is also applicable to other previous embodiments.

During the process (from $t_2$ to $t_3$) in which the inductance current declines for the first time in one switching period, particularly at the time point $t_2$, the drive time and timing prediction module 203 sends the turn-on drive signal to the free-wheeling switch $S_1$ to turn on the switch $S_1$, thereby achieving synchronous rectification.

After the time $T_{off}$ obtained by calculation, it reaches the time point $t_3$, and the drive time and timing prediction module 203 sends the turn-off drive signal to the free-wheeling switch $S_1$ to turn off $S_1$.

In a further embodiment, the sampling conversion module 201 also may sample an output power of the main power circuit 10, and the smaller the sampling value of the output power is, the larger the k selected by the drive time and timing prediction module is, thereby reducing the operating frequency of the power converter when operating at the light load.

Method Two, the threshold control circuit is a digital logical control circuit.

Figure 12:
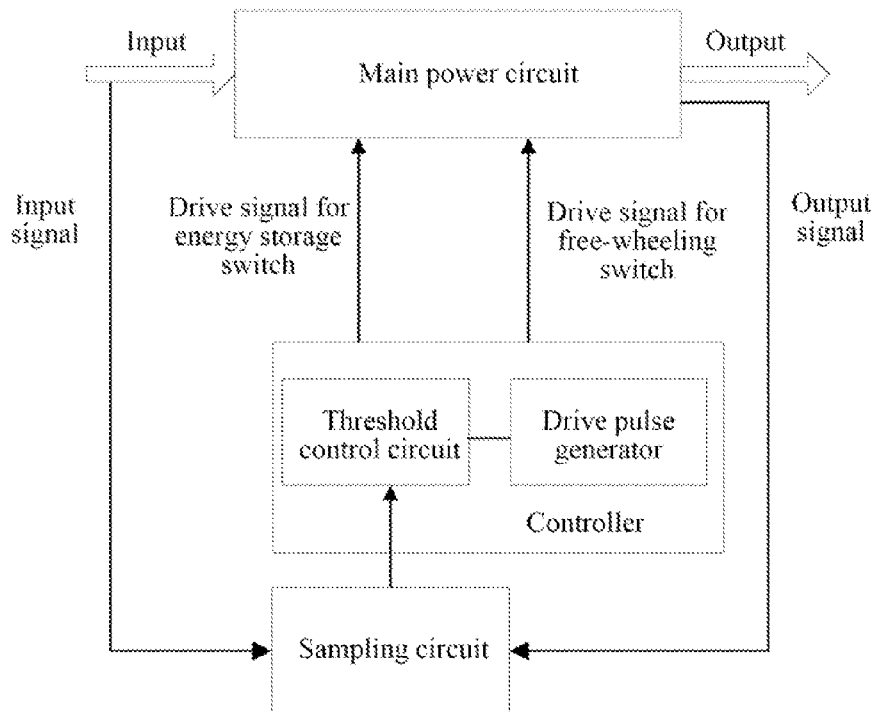
FIG. 12 shows a structural diagram of the power converter of the present application which achieves ZVS control in Method Two.

Specifically, the controller comprises a drive pulse generator, and the digital logic control circuit and the drive pulse generator are electrically connected with each other. FIG. 12 shows a structural diagram of another embodiment of the power converter.

Figure 14:
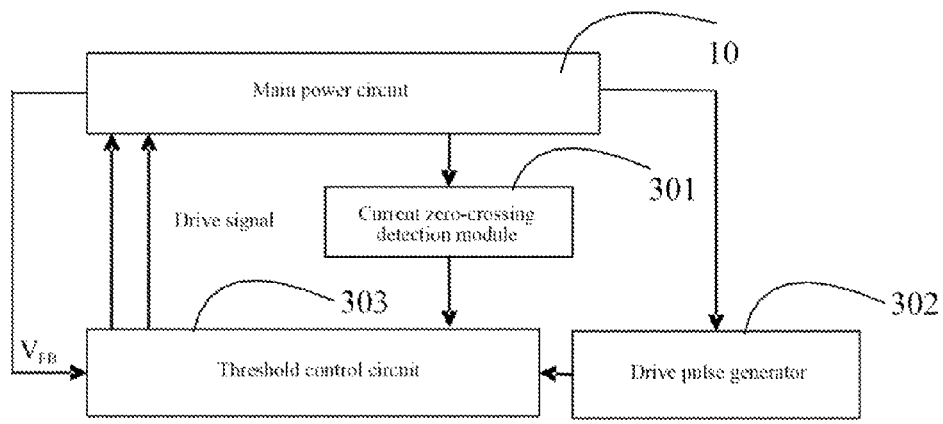
FIGS. 14-16 show specific structural diagrams of the power converter of the present application which achieves ZVS control in Method Two.

FIG. 14 shows an embodiment in which the control of a main power circuit is correspondingly achieved when the threshold control circuit is a digital logical control circuit in FIG. 12. The power converter comprises a main power circuit 10, a current zero-crossing detection module 301, a drive pulse generator 302, and a threshold control circuit 303. The current zero-crossing detection module 301 corresponds to the sampling circuit. The main power circuit 10 is the same as that in the previous embodiment.

The current zero-crossing detection module 301 is used for obtaining a zero-crossing time point of the inductance current.

The drive pulse generator 302 generates drive pulses for the energy storage switch and the free-wheeling switch in accordance with a feedback signal from the main power circuit 10.

Figure 13:
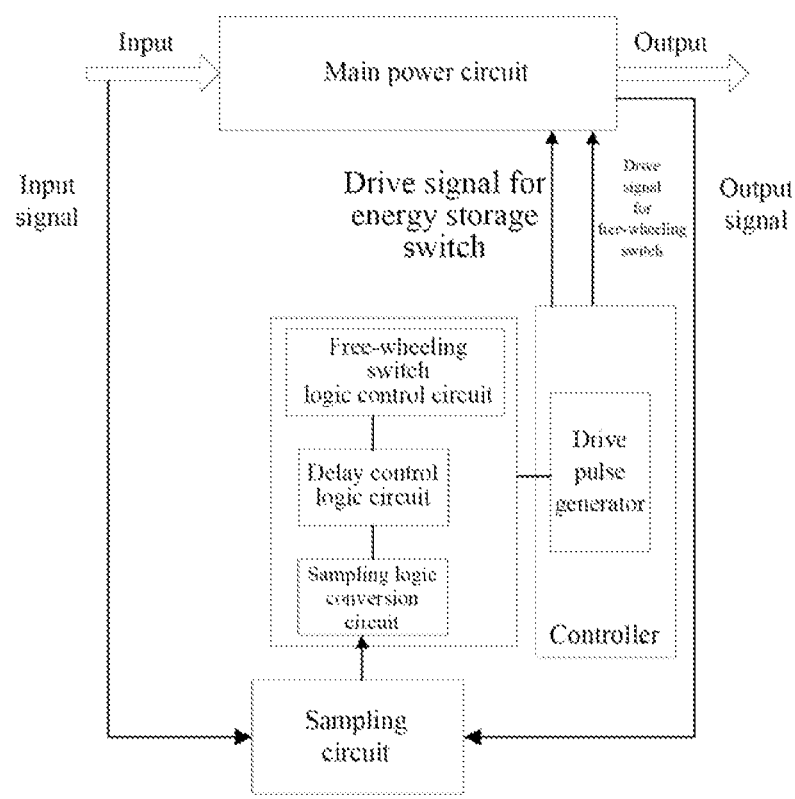
FIG. 13 shows a detailed structural diagram of the power converter of the present application which achieves ZVS control in Method Two.

The threshold control circuit 303 is used for making the free-wheeling switch to be continuously turned off from the time when the current zero-crossing detection module 301 obtains a first zero-crossing time point, and turning on the free-wheeling switch for the turn-on duration $$T_{syn\_rec} \geq \frac{\sqrt{(2V_{in} - V_o) \cdot V_o}}{\omega_0 (V_o - V_{in})}$$

when the inductor and the parasitic capacitor in the main power circuit complete a k-th resonance period, and turning on the energy storage switch when a voltage between two terminals of the energy storage switch is resonated to a threshold value, wherein k is a positive integer. In one specific embodiment, the threshold control circuit comprises a sampling logic conversion circuit, a delay control logic circuit, and a free-wheeling switch logic control circuit, as shown in FIG. 13. The sampling circuit samples a current of the inductor in the main power circuit and outputs the sample signal to the sampling logic conversion circuit, the sampling logic conversion circuit outputs a trigger signal to the delay control logic circuit, and the delay control logic circuit outputs a signal to the logic control circuit of the free-wheeling switch. The logic control circuit of free-wheeling switch drives the drive pulse generator to send or not send a pulse signal for driving the free-wheeling switch to be turned on again, in accordance with the output signal of the delay control logic circuit.

Figure 15:
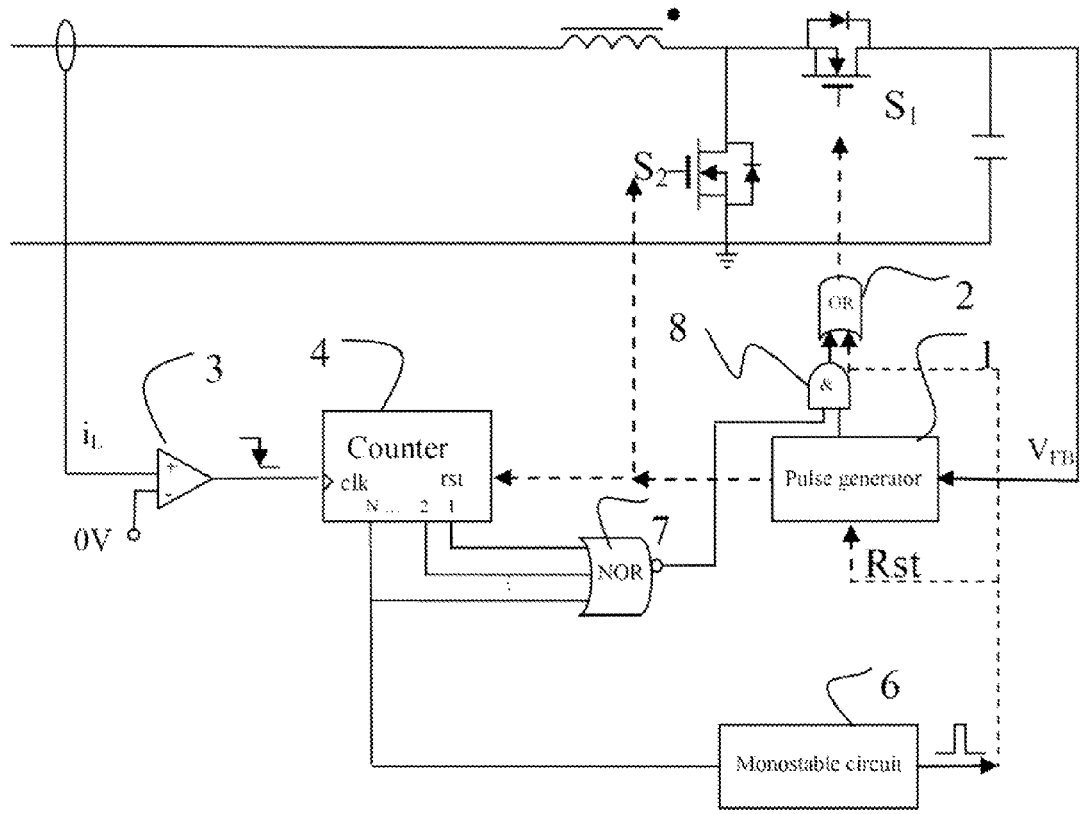

As for the implementation example of respective parts of the threshold control circuit as shown in FIG. 13, FIG. 15 illustrates a more specific implementation module diagram. Wherein, $V_{FB}$ is a sample signal of the output voltage of the main power circuit 10, $i_L$ is a sample signal of the inductance current. The sampling logic conversion circuit is implemented by a comparator 3 in FIG. 15. The comparator 3 compares the sample signal $i_L$ of the inductance current with a reference signal (a zero signal under ideal conditions), and generates a negative voltage jump at a zero-crossing time point when the inductance current changes from positive to negative.

The drive pulse generator 302 is implemented by a pulse generator 1. The pulse generator 1 generates the drive signals for the energy storage switch $S_2$ and the free-wheeling switch $S_1$ in accordance with $V_{FB}$, and obtains a stable output voltage.

The delay control logic circuit is implemented by a counter 4, a NOR gate 7, an AND gate 8, and an OR gate 2.

The free-wheeling switch logic control circuit is implemented by a monostable circuit 6 and the OR gate 2 cooperated with the pulse generator 1. A reset terminal of the counter 4 is connected with an output terminal of the pulse generator 1 to receive a drive signal of the pulse generator 1 for the energy storage switch $S_2$, and an input terminal of the counter 4 is connected with an output terminal of the comparator 3. Especially, when the reset terminal of the counter 4 receives a drive signal for turning off the energy storage switch $S_2$, the counter 4 begins to count the negative voltage jump. Every time the counter 4 receives one negative voltage jump, a counting terminal of the counter 4 which is corresponding to the time is set as logic 1, and other counting terminals are set as 0. A counting terminal of the counter 4 which is corresponding to the first time is preset as 0. When an arbitrary counting terminal of the counter 4 is 1, it shows that the free-wheeling switch $S_1$ may be turned on.

The NOR gate 7 is connected with all counting terminals of the counter 4, and when any one of the counting terminals outputs 1, the NOR gate 7 outputs 0.

An output of the NOR gate 7 is connected to an input terminal of the AND gate 8, and the other input terminal of the AND gate 8 is connected to the pulse generator 1 to receive the drive signal from the pulse generator 1 for the free-wheeling switch $S_1$.

An N-th counting terminal of the counter 4 is fixedly connected to the monostable circuit 6, and an output terminal of the monostable circuit 6 is connected to an input terminal of the OR gate 2. The monostable circuit 6 outputs a narrow pulse with a fixed width when the N-th counting terminal outputs 1. The other input terminal of the OR gate 2 is connected with an output terminal of the AND gate 8. However, in other embodiments, the monostable circuit 6 may be connected with different counting terminals of the counter according to the designer's requirements, and is not limited to the example in which the monostable circuit 6 is connected with the N-th counting terminal of the counter 4.

When the reset terminal of the counter 4 receives the drive signal for turning off the energy storage switch $S_2$, the counter 4 begins to count the negative voltage jump.

If N is preset as 3, that is, when three resonance periods are completed, the turn-on of the free-wheeling switch is explained as following.

When the counter 4 receives the negative voltage jump for the first time, since the counting terminal of the counter 4 which is corresponding to the first time has been preset as 0, the NOR gate 7 outputs 1. At this moment, the drive pulse for the free-wheeling switch $S_1$ which is output from the pulse generator 1 is set as 0, and the AND gate 8 outputs 0 to the OR gate 2.

Since the third counting terminal connected to the monostable circuit 6 is 0, the monostable circuit 6 cannot output the narrow pulse at this moment. The OR gate 2 cannot output 1, and the free-wheeling switch $S_1$ is in a turn-off state.

When the counter 4 receives the negative voltage jump for the second time, the counting terminal of the counter 4 which is corresponding to the second time outputs 1, so the NOR gate 7 outputs 0 to the AND gate 8, and the AND gate 8 also outputs 0 to the OR gate 2. The monostable circuit 6 still cannot receive 1 which is output from the counting terminal of the counter 4 corresponding to the second time, so it cannot output a narrow pulse with a fixed width to the OR gate 2, and the OR gate 2 outputs 0 to maintain the free-wheeling switch $S_1$ to be turned off.

When the counter 4 receives the negative voltage jump for the third time, the third counting terminal of the counter 4 outputs 1, so the NOR gate 7 outputs 0. At this moment, the monostable circuit 6 receives 1 which is output from the third counting terminal of the counter 4, so it outputs a narrow pulse with a fixed width to the OR gate 2, and the OR gate 2 outputs 1 to drive the free-wheeling switch $S_1$ to be turned on and to reversely store energy for the magnetic element (inductor). Meanwhile, the narrow pulse is also sent to the pulse generator 1 to reset it, so as to generate the pulse for the energy storage switch and the drive signal for the free-wheeling switch in the next period.

Through the above description, it can be known that by using the structure shown in FIG. 15, the free-wheeling switch may be turned on after completing the preset integer number of resonance periods.

Figure 16:
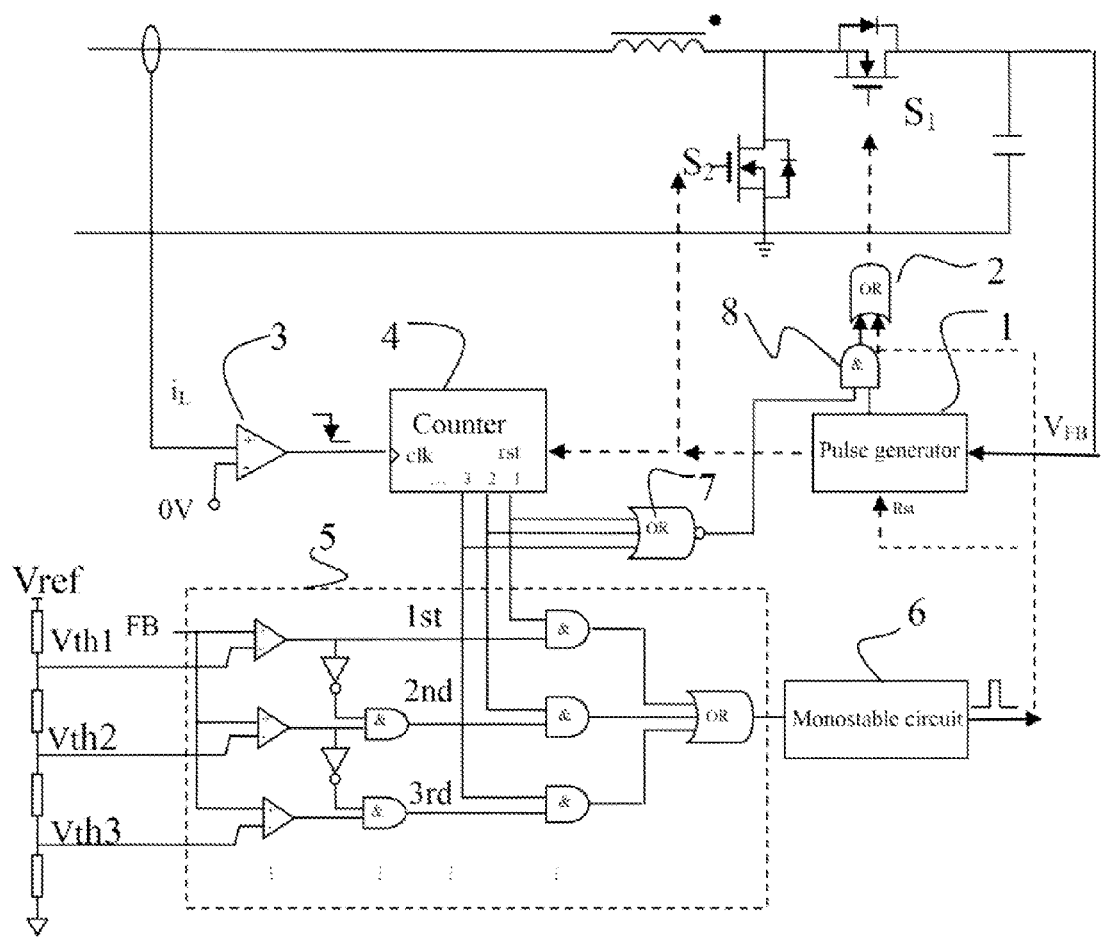

Herein, on the basis of the threshold control circuit as illustrated by FIG. 15, FIG. 16 illustrates another embodiment of the threshold control circuit, and the threshold control circuit in FIG. 16 adds a dynamic selection circuit 5. In the embodiment as shown in FIG. 16, the delay logic control circuit comprises the dynamic selection circuit 5 to receive a sample signal FB of the output power and a reference signal $V_{ref}$, which facilitates achieving the corresponding delay logic control in accordance with the current state of the main power circuit.

Specifically, $V_{FB}$ is a sample signal of the output voltage of the main power circuit 10, and $i_L$ is a sample signal of the inductance current.

The dynamic selection circuit 5 comprises a plurality of comparative lines and an OR gate, and final outputs of all comparative lines are connected to the OR gate. FIG. 16 takes three comparative lines as an example, but not limited thereto. The first comparative line (1st) comprises a first comparator, a NOT gate and an AND gate.

An input terminal of the first comparator receives the FB, and the other input terminal receives a reference value $V_{th1}$. An output terminal of the first comparator is connected with an input terminal of the AND gate, and the other input terminal of the AND gate is connected with a first counting terminal of the counter 1. The output terminal of the first comparator is also connected to the NOT gate. An output terminal of the AND gate is connected with the OR gate.

The second comparative line (2nd) comprises a second comparator, a NOT gate, a first AND gate, and a second AND gate.

An input terminal of the second comparator receives the FB, and the other input terminal receives a reference value $V_{th2}$. An output terminal of the second comparator is connected with an input terminal of the first AND gate, and the other input terminal of the first AND gate is connected with the output terminal of the NOT gate in the first comparative line (1st). An output terminal of the first AND gate is connected with an input terminal of the second AND gate, and the other input terminal of the second AND gate is connected with a second counting terminal of the counter 1. The output terminal of the second comparator is also connected to the NOT gate. An output terminal of the second AND gate is connected with the OR gate.

The third comparative line (3rd) comprises a third comparator, a first AND gate, and a second AND gate.

An input terminal of the third comparator receives the FB, and the other input terminal receives a reference value Vth3. An output terminal of the third comparator is connected with an input terminal of the first AND gate, and the other input terminal of the first AND gate is connected with the output terminal of the NOT gate in the second comparative line (2nd). An output terminal of the first AND gate is connected with an input terminal of the second AND gate, and the other input terminal of the second AND gate is connected with a third counting terminal of the counter 1. An output terminal of the second AND gate is connected with the OR gate.

Wherein $V_{th1}>V_{th2}>V_{th3}$, and when zero-crossing occurs, the smaller the FB is, the larger the N selected by the threshold control circuit is.

Specifically, by comparing the FB with the reference value, when the FB is larger than the reference value, the corresponding comparator outputs 1. For example, when $V_{th1}>V_{th2}>FB>V_{th3}$, in the first comparative line (1st), the first comparator outputs 0, and the first comparative line (1st) outputs 0 to the OR gate.

In the second comparative line (2nd), the second comparator outputs 0, then the first AND gate outputs 0, the second AND gate outputs 0 to the OR gate, and the NOT gate outputs 1 to the first AND gate in the third comparative line (3rd).

In the third comparative line (3rd), the third comparator outputs 1, and then the first AND gate outputs 1. When the counting terminal of the counter 4 which is corresponding to the third time outputs 1, the second AND gate outputs 1 to the OR gate to trigger the monostable circuit 6 to send the narrow pulse, and turn on the free-wheeling switch.

As can be seen, the technical solution of the present application may select the desired counting terminal by utilizing the circuit 5 to trigger the monostable circuit 6, thereby generating a trigger pulse of the free-wheeling switch for ZVS.

Especially, a more optimized control is achieved by utilizing the feedback signal (FB) to dynamically select the number of inserted resonance periods. In the embodiment, the counting terminal of the counter which is corresponding to the first time may not be preset as 0 in combination with the solution in the Background Art. When the load is heavy, the first zero-crossing time point is selected to trigger the monostable circuit 6, that is, the frequency reduction process is not performed (i.e. the solution as described in FIG. 3); when the load becomes lighter, the FB becomes smaller, the second, the third . . . or more zero-crossing time points of the inductance current is selected to trigger the monostable circuit 6; and when the load is light, the operating frequency is controlled to be relatively low, which facilitates improving the efficiency of the power converter with light load.

The threshold control circuit in the above illustrated power converter not only may be implemented by being integrated in the controller of the power converter by software programming, but also may be implemented by employing the digital logic circuit. The implementation of the digital logic circuit is not limited to the two simple embodiments as illustrated in FIGS. 15 and 16. As for those skilled in the art, the digital logic modules with the same function may employ specific implementation modes with a variety of different forms, so FIGS. 15 and 16 merely illustrate two forms to specifically implement these digital logic modules, and are not considered as a limitation to the protection scope of Claims. Of course, the threshold control circuit of these two forms also may be implemented by partly employing the digital logic circuit and partly employing the software programming Through the above solution, the present application may achieve the control of the energy storage switch to decline to the threshold voltage when being turned on without adding any additional auxiliary elements in the main power circuit, while enabling the power converter to have a relatively high efficiency. In addition, the present application also may achieve operation in a relative low operating frequency at a light load, and improve the efficiency of the power converter.

What is claimed is:

1. A controlling method of a power converter which at least comprises an inductor, a parasitic capacitor, an energy storage switch and a free-wheeling switch, the controlling method is used for enabling the energy storage switch to maintain zero-voltage turn-on during the normal operation of the power converter; wherein the controlling method comprising:

within a switching period, the free-wheeling switch is turned on again for a preset time after the free-wheeling switch is turned on and turned off for the first time and after the inductor and the parasitic capacitor resonate, so that a voltage between two terminals of the energy storage switch can decline to a threshold value, and when the voltage between two terminals of the energy storage switch declines to be less than or equal to the threshold value, the energy storage switch is turned on, thereby entering the next switching period of the power converter.

2. The controlling method of claim 1, wherein the free-wheeling switch further comprises a synchronous rectifier switch and a free-wheeling diode, and when the free-wheeling switch is turned on for the first time, the free-wheeling diode is turned on, or both the synchronous rectifier switch and the free-wheeling diode are turned on.

3. The controlling method of claim 1, wherein the preset time $T_{syn\_res}$ satisfies the following Formula:

$$T_{syn\_rec} \geq \frac{\sqrt{(2V_{in} - V_o) \cdot (V_o - V_{th})}}{\omega_0 (V_o - V_{in})}$$

wherein $\omega_0 = 1/\sqrt{L \cdot C_{para}}$, L is an inductance value of the inductor, $C_{para}$ is a capacitance value of the parasitic capacitor, $V_{in}$ is an input voltage of the power converter, $V_o$ is an output voltage of the power converter, and $V_{th}$ is the threshold value.

4. The controlling method of claim 3, further comprising:
a time point of turning on the free-wheeling switch again corresponds to a time point when the inductor and the parasitic capacitor complete a k-th resonance period, wherein k>0, and k is an integer or a decimal fraction.

5. The controlling method of claim 4, wherein when the free-wheeling switch needs to be turned on at least twice within a switching period of the power converter, the switching period of the power converter is controlled to satisfy the following Formula:

$$T_s = T_{on} + T_{off} + k \cdot T_{r1} + T_{syn\_rec} + T_{r2}$$

$$T_{off} = T_{on} \frac{V_{in}}{V_o - V_{in}}$$

$$T_{r1} = \frac{2\pi}{\omega_0}$$

$$T_{r2} = \frac{2\arctan\left(\frac{-i_L(t_6) \cdot Z_0 - \sqrt{(i_L(t_6) \cdot Z_0)^2 - (2V_{in} - V_o)(V_o - V_{th})}}{2V_{in} - V_o}\right)}{\omega_0}$$

$$i_L(t_6) = \frac{V_{in} - V_o}{L} \cdot T_{syn\_rec}$$

$$Z_0 = \sqrt{L/C_{para}}$$

$T_s$ is the switching period of the power converter, $T_{on}$ is the turn-on duration of the energy storage switch, $T_{off}$ is the turn-on duration of the free-wheeling switch for the first time within the switching period $T_s$, $T_{r1}$ is a resonance period of the inductor and the parasitic capacitor, $t_6$ is a turn-off time point of the free-wheeling switch for the second time within the switching period $T_s$, and $T_{r2}$ is a required time for the voltage between two terminals of the energy storage switch resonating to the threshold value from the time point $t_6$.

6. The controlling method of claim 1, further comprising:
a time point when the free-wheeling switch is controlled to be turned on again is a time point when a voltage between two terminals of the free-wheeling switch is zero during the resonance time of the inductor and the parasitic capacitor.

7. The controlling method of claim 1, wherein the controlling method may be applied to the case in which an input voltage of the power converter is larger than one half of an output voltage of the power converter.

8. The controlling method of claim 1, wherein when the power converter operates at a light load, a time between a time point when the free-wheeling switch is turned off for the first time and a time point when the free-wheeling switch is turned on again within one switching period of the power converter is controlled to be at least larger than a resonance period of the inductor and the parasitic capacitor.

9. The controlling method of claim 1, wherein the threshold value is set to be zero.

10. A power converter, comprising:
a main power circuit, which at least comprises an inductor, a parasitic capacitor, an energy storage switch, and a free-wheeling switch;
a sampling circuit for sampling input and output signals of the main power circuit; and
a controller for generating a control signal to control turn-on and turn-off of the energy storage switch and the free-wheeling switch,
wherein the controller further comprises a threshold control circuit for receiving the sample signal of the sampling circuit to control the free-wheeling switch to be turned on again for a preset time within one switching period of the power converter, so that a drain-source voltage of the energy storage switch is less than or equal to the threshold value when the next period of the power converter starts.

11. The power converter of claim 10, wherein both the threshold control circuit and the sampling circuit are digital program modules.

12. The power converter of claim 11, wherein the controller is a MCU or DSP digital control chip, and the digital program module is assembled in the digital control chip.

13. The power converter of claim 11, wherein the digital program module comprises a sampling conversion module, a closed-loop calculation module, and a drive time and timing prediction module.

14. The power converter of claim 13, wherein the sampling conversion module converts the sample signal to a digital signal.

15. The power converter of claim 13, wherein the closed-loop calculation module calculates the turn-on duration of the energy storage switch within one switching period of the power converter in accordance with the signal provided by the sampling conversion module.

16. The power converter of claim 13, wherein the drive time and timing prediction module receives signals output from the closed-loop calculation module and the sampling conversion module, and predicts turn-on time of the energy storage switch, two times turn-on time of the free-wheeling switch and an interval time therebetween, and a switching period in the next switching period or each of the next several switching periods.

17. The power converter of claim 10, wherein the threshold control circuit is a digital logic control circuit.

18. The power converter of claim 17, wherein the controller comprises a drive pulse generator, and the digital logic control circuit and the drive pulse generator are electrically connected with each other.

19. The power converter of claim 18, wherein the digital logic control circuit comprises a sampling logic conversion circuit, a delay control logic circuit, and a free-wheeling switch logic control circuit.

20. The power converter of claim 19, wherein the sampling circuit samples a current of the inductor and outputs a sample signal to the sampling logic conversion circuit, the sampling logic conversion circuit outputs a trigger signal to the delay control logic circuit, and the delay control logic circuit outputs a signal to the free-wheeling switch logic control circuit.

21. The power converter of claim 20, wherein the free-wheeling switch logic control circuit sends or does not send a pulse signal for driving the free-wheeling switch to be turned on again, in accordance with the output signal of the delay control logic circuit.

22. The power converter of claim 10, wherein the power converter is a DC/DC converter or a PFC circuit.

* * * * *

UNITED STATES PATENT AND TRADEMARK OFFICE
CERTIFICATE OF CORRECTION

PATENT NO. : 9,590,518 B2
APPLICATION NO. : 14/952878
DATED : March 7, 2017
INVENTOR(S) : Yan et al.

It is certified that error appears in the above-identified patent and that said Letters Patent is hereby corrected as shown below:

On the Title Page

Item (54) and in the Specification, Column 1, Lines 1-2, the Title of Invention should read as "POWER CONVERTER AND CONTROLLING METHOD OF THE SAME," rather than "POWER CONVERTER AND CONTROLLING METHOD THEREOF".

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*